(12) United States Patent
Cope et al.

(10) Patent No.: US 12,309,493 B2
(45) Date of Patent: *May 20, 2025

(54) AERIAL CAMERA SYSTEM

(71) Applicant: Spookfish Innovations PTY LTD, Bentley (AU)

(72) Inventors: Simon Cope, Burswood (AU); Michael Von Bertouch, Bicton (AU)

(73) Assignee: Spookfish Innovations PTY LTD, Bentley (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,848

(22) Filed: Apr. 15, 2024

(65) Prior Publication Data

US 2024/0348922 A1    Oct. 17, 2024

Related U.S. Application Data

(63) Continuation of application No. 17/722,000, filed on Apr. 15, 2022, now Pat. No. 11,962,903, which is a continuation of application No. 16/688,565, filed on Nov. 19, 2019, now Pat. No. 11,310,427, which is a continuation of application No. 16/226,320, filed on
(Continued)

(30) Foreign Application Priority Data

Oct. 8, 2014  (AU) .................................. 2014904018
Apr. 14, 2015  (AU) ................................. 2015901332

(51) Int. Cl.
| | | |
|---|---|---|
| *H04N 5/00* | (2011.01) | |
| *B64D 47/08* | (2006.01) | |
| *G01C 11/02* | (2006.01) | |
| *G03B 15/00* | (2021.01) | |
| *G03B 17/17* | (2021.01) | |
| *H04N 7/18* | (2006.01) | |
| *H04N 23/68* | (2023.01) | |
| *H04N 23/69* | (2023.01) | |

(52) U.S. Cl.
CPC ........... *H04N 23/685* (2023.01); *B64D 47/08* (2013.01); *G01C 11/02* (2013.01); *G03B 15/006* (2013.01); *G03B 17/17* (2013.01); *H04N 7/181* (2013.01); *H04N 23/681* (2023.01); *H04N 23/69* (2023.01); *G03B 2205/0007* (2013.01)

(58) Field of Classification Search
CPC ............................. H04N 5/2328; B64D 47/08
USPC .......................................................... 348/146
See application file for complete search history.

(56) References Cited

U.S. PATENT DOCUMENTS

| | | | | |
|---|---|---|---|---|
| 6,366,734 | B1 * | 4/2002 | Beran ................ | G01C 11/025 348/146 |
| 11,962,903 | B2 * | 4/2024 | Cope ................... | H04N 23/685 |

* cited by examiner

*Primary Examiner* — Jeffery A Williams
(74) *Attorney, Agent, or Firm* — DUNLAP CODDING, P.C.

(57) ABSTRACT

Aerial camera systems are disclosed, including an aerial camera system that comprises at least one camera arranged to capture a plurality of successive images; the at least one camera being rotatable such that the field of view of the camera traverses across a region of the ground that includes multiple different swathes extending in different directions, the at least one camera having a steering mirror to direct light reflected from the ground onto a lens assembly, the lens assembly having a central longitudinal axis extending in a direction generally parallel to a direction of movement of a survey aircraft; and the system arranged to control the at least one camera to capture successive images at defined intervals as the at least one camera rotates.

24 Claims, 18 Drawing Sheets

Related U.S. Application Data

Dec. 19, 2018, now Pat. No. 11,265,472, which is a continuation of application No. 15/513,538, filed as application No. PCT/AU2015/000606 on Oct. 8, 2015, now abandoned.

AERIAL CAMERA SYSTEM

CROSS-REFERENCE TO RELATED APPLICATIONS

The present patent application claims priority to and is a continuation of the patent application filed Apr. 15, 2022, identified by Ser. No. 17/722,000; which claims priority to and is a continuation of the patent application filed Nov. 19, 2019, identified by Ser. No. 16/688,565; which claims priority to and is a continuation of the patent application filed Dec. 19, 2018, identified by Ser. No. 16/226,320, which issued on Mar. 1, 2022, as U.S. Pat. No. 11,265,472; which claims priority to and is a continuation of the patent application filed Mar. 22, 2017, identified by Ser. No. 15/513,538, now abandoned; which is a national stage filing from the PCT application filed Oct. 8, 2015, identified by serial number PCT/AU2015/000606, publication number WO2016/054681; which claims priority to the Australian provisional patent application filed Apr. 14, 2015, identified by serial number AU2015901332, and to the Australian provisional patent application filed Oct. 8, 2014, identified by serial number AU2014904018; the entire contents of each of which are hereby incorporated by reference herein.

FIELD OF THE INVENTION

The present invention relates to an aerial camera system for capturing ground images from a survey aircraft.

BACKGROUND OF THE INVENTION

It is known to provide an aerial camera system that is arranged to capture ground images from a survey aircraft. Typically, the aerial camera system is mounted to an underside portion of the survey aircraft and ground images are captured as the survey aircraft moves along defined flight lines. The system is arranged to capture multiple images for each ground feature, which enables a photogrammetric solution, such as a bundle adjustment process, to be applied to the captured images in order to determine a best case solution for interior and exterior orientation information associated with each camera used and the images captured by each camera. The solution produced by the bundle adjustment process may then be used to produce nadir and/or oblique photomaps.

In order to improve the photogrammetric solution produced by the bundle adjustment process, the number of images taken for each ground feature must be increased, and typically this is achieved by capturing images more frequently so that the overlap between successively captured images is increased, and by ensuring that sufficient overlap exists between adjacent flight lines.

In order to produce a good photogrammetric solution, a redundancy of about 10 is generally required, but with a relatively long associated focal length for each image and relatively large image overlaps, the ratio of distance between camera locations at image capture and distance to target (the 'base-to-height' ratio) is relatively small, which affects accuracy of the photogrammetric solution.

Productivity of an aerial camera system is determined according to the amount of ground area captured per hour at a given resolution. Therefore, since flying costs are primarily determined on an hourly rate, if a system captures more ground area per hour, then the cost per unit area decreases.

Productivity in relation to the ground area captured per hour at a defined resolution can potentially be increased by flying faster, flying higher and/or using a wider field of view (FoV).

However, flying a survey aircraft faster causes motion blur at higher speeds. An acceptable level of motion blur is typically 50% of 1 pixel, and is given by:

$$\text{Blur} = \text{speed of aircraft} * \text{shutter speed}$$

For an aircraft travelling at 75 m/s with a $\frac{1}{2000}$ s shutter speed, the motion blur is:

$$\text{Blur} = 75 * 1/2000 = 0.0375 \text{ m } (3.75 \text{ cm})$$

Therefore, if it is desired to capture imagery at a resolution of 7.5 cm, the survey aircraft cannot travel any faster than 75 m/s if blur is to be maintained at an acceptable level. The speed of the aircraft can however be increased without unduly affecting the resolution by using forward motion compensation (FMC).

FMC is typically implemented using either an orthogonal transfer CCD or with a motion compensation camera mount which physically moves the camera during the exposure to keep the image relatively steady on the sensor during exposure.

Flying higher causes a greater area of ground to be covered, although increasing the area of ground covered whilst maintaining the same field of view causes the resolution to degrade unless longer focal length lenses or a higher resolution sensor are used.

While longer focal length lenses maintain resolution, the FoV is narrower, which negates the increase in altitude. Higher resolution sensors are limited by available technology, and image quality typically degrades as the sensor resolution increases because the light collecting area is smaller. Higher resolution sensors also typically have lower data throughput rates. For example, 250 MegaPixel (MP) 14 bit sensors may have a data readout rate as low as 232 MB/s, whereas a sub-20 MP sensor may have data readout rates exceeding 1 GB/s. Higher resolution sensors are also typically more expensive.

Using a wider FoV allows a wider swathe of the ground to be imaged, but perspective distortion occurs to the extent that 50°-60° is generally considered to be an upper limit for FoV.

An effective increase in FoV can be achieved by using multiple sensors arranged in a contiguous array to create a wider total system FoV, although such an arrangement is generally constrained by packaging.

SUMMARY OF THE INVENTION

An aerial camera system is disclosed that comprises: at least one camera arranged to capture a plurality of successive images; the field of view of at least one camera being movable in a substantially transverse direction across a region of the ground; the system arranged to control the at least one camera to capture successive images at defined intervals as the field of view moves; and the system arranged to reduce the speed of movement of the field of view in synchronization with capture of an image.

In an embodiment, the system is arranged to stop movement of the field of view in synchronization with capture of an image.

In an embodiment, the at least one camera is rotatable such that the field of view of the camera is movable in a substantially transverse direction across a region of the ground.

In an embodiment, the system is arranged to rotate the at least one camera about an axis substantially parallel to the direction of movement of the survey aircraft. In an embodiment, the system is arranged to rotate the at least one camera by oscillating the at least one camera between a rotational start position and a rotational end position. The rotational start position may correspond to about −35° and the rotational end position may correspond to about +35°.

In an embodiment, the system is arranged to control rotation of the at least one camera using a servo motor and a rotary encoder.

In an embodiment, the system is arranged to use a detected position and/or orientation of the survey aircraft to determine whether to modify the rotational position of the at least one camera in order to provide at least partial compensation for changes to the position and/or orientation of the survey aircraft.

In an embodiment, the at least one camera is mounted in a camera tube and the system is arranged to control rotation of the camera tube.

In an embodiment, the system comprises at least one ortho camera arranged to capture images representative of a ground area substantially directly beneath the survey aircraft.

In an embodiment, the system comprises at least one oblique camera arranged to capture oblique images representative of a ground area that is not located substantially directly beneath the survey aircraft. The or each oblique camera may be arranged such that the field of view of the oblique camera is directed at an angle approximately 20° from vertical.

In an embodiment, the system comprises at least one rear oblique camera arranged such that the field of view of the rear oblique camera is directed rearwardly of the survey aircraft, and at least one forward oblique camera arranged such that the field of view of the forward oblique camera is directed forwardly of the survey aircraft.

In an embodiment, each oblique camera is mounted such that the field of view of each oblique camera traverses across a region of the ground that includes multiple different oblique swathes extending in different directions as the at least one oblique camera rotates.

In an embodiment, multiple camera tubes are provided, each camera tube including at least one ortho and/or at least one oblique camera.

In an arrangement, the system is arranged to control the at least one ortho camera to capture successive images at defined intervals as the at least one camera rotates such that successive images overlap by about 2%.

In an arrangement, the system is arranged to control the at least one ortho camera to capture successive images such that adjacent ground coverage footprints in a direction parallel to the direction of travel of the survey aircraft overlap by about 70%.

In an arrangement, the system is arranged to control survey aircraft flight lines such that ortho camera ground coverage footprints of adjacent flight lines overlap by about 70%.

In an embodiment, the system is arranged such that adjacent oblique ground coverage footprints overlap by about 33%.

In an embodiment, each ortho camera has an associated ortho lens assembly arranged to focus light onto at least one ortho sensor, and each oblique camera assembly has an associated oblique lens assembly arranged to focus light onto at least one oblique sensor, the oblique lens assembly having a focal length about 40% longer than the focal length of the ortho lens assembly.

In an embodiment, each camera has an associated steering mirror arranged to direct light onto a lens assembly.

In an embodiment, the at least one camera is oriented such that a central longitudinal axis of a lens assembly of the camera extends in a direction generally parallel to the direction of movement of the survey aircraft, and the system is arranged to rotate the steering mirror about an axis generally transverse to the direction of movement of the survey aircraft so as to provide at least partial compensation for forward movement of the survey aircraft. The steering mirror may be rotated such that the steering mirror moves at a speed substantially corresponding to the instantaneous speed of the survey aircraft. The steering mirror may be arranged to rotate in a first direction corresponding to the direction of movement of the survey aircraft from a defined start position to a defined end position in order to at least partially compensate for forward movement of the survey aircraft, then to rotate in a second opposite direction to bring the steering mirror back to the defined start position.

In an embodiment, the system is arranged to use a detected orientation of the survey aircraft to determine whether to modify the rotational position of the steering mirror in order to provide at least partial compensation for changes to the orientation of the survey aircraft.

In an embodiment, the at least one camera is oriented such that a central longitudinal axis of a lens assembly of the camera extends in a direction generally perpendicular to the direction of movement of the survey aircraft.

In an embodiment, the field of view of the camera is movable in a substantially transverse direction across a region of the ground by rotating the steering mirror, and the system is arranged to reduce the speed of movement of steering mirror in synchronization with capture of an image.

In an embodiment, the shape of each ground coverage footprint is controllable by controlling when to start and stop image capture as the respective at least one camera rotates.

Also disclosed is an aerial camera system comprising: at least one oblique camera arranged to capture a plurality of successive oblique images; the at least one oblique camera being rotatable such that the field of view of the camera traverses across a region of the ground that includes multiple different oblique swathes extending in different directions; and the system arranged to control the at least one oblique camera to capture successive oblique images at defined intervals as the at least one oblique camera rotates.

In an embodiment, the field of view of the oblique camera traverses across a substantially at least partially parabolic shaped region of the ground.

Also disclosed is an aerial camera system comprising: at least one camera arranged to capture a plurality of successive images, the at least one camera including at least one respective image sensor, and the field of view of the camera being movable in a substantially transverse direction across a region of the ground; and a stabilisation assembly associated with each camera, the stabilisation assembly including at least one steering mirror that is controllably movable so as to translate the optical axis of the camera relative to the at least one image sensor in synchronization with image capture so as to effect stabilisation of an image on the at least one image sensor during image capture as the field of view of the camera moves in a substantially transverse direction across a region of the ground; the system arranged to control the at least one camera to capture successive images at defined intervals as the field of view of the camera moves in a substantially transverse direction across a region of the ground.

In an embodiment, the at least one camera is rotatable such that the field of view of the camera is movable in a substantially transverse direction across a region of the ground.

In an embodiment, the stabilisation assembly comprises one steering mirror.

In an embodiment, the stabilisation assembly comprises two steering mirrors, a first steering mirror rotated by a first rotational amount and a second steering mirror rotated by a second rotational amount, the first and second rotational amounts being such that the direction of propagation of a light ray directed by the first and second steering mirrors before rotation of the first and second steering mirrors is substantially parallel to the direction of propagation of a light ray directed by the first and second steering mirrors after rotation of the first and second steering mirrors, and such that the light ray after rotation of the first and second steering mirrors is translated relative to the light ray before rotation of the first and second steering mirrors on a sensor.

In an embodiment, the first steering mirror and the second steering mirror are arranged such that the length of the optical path between a reference point on a ray incident on the first steering mirror and a sensor is substantially the same before rotation of the first and second steering mirrors as after rotation of the first and second steering mirrors.

In an embodiment, the stabilisation assembly comprises a fixed mirror in an optical path between the first and second steering mirrors.

In an embodiment, the stabilisation assembly comprises a common mirror assembly, the common mirror assembly including a first steering mirror and a second steering mirror fixedly disposed relative to each other, the common mirror assembly being movable so as to effect movement of the first and second steering mirrors.

In an embodiment, the at least one steering mirror oscillates in synchronization with image capture.

In an embodiment, at least one steering mirror is controlled by a piezo-electric actuator.

In an embodiment, the at least one camera is oriented such that a central longitudinal axis of a lens assembly of the camera extends in a direction generally perpendicular to the direction of movement of the survey aircraft.

In an embodiment, each camera has an associated steering mirror arranged to direct light onto a lens assembly, and the field of view of each camera is movable in a substantially transverse direction across a region of the ground by rotating the steering mirror.

In an embodiment, the stabilisation assembly comprises one steering mirror.

In an embodiment, the stabilisation assembly comprises two steering mirrors, a first steering mirror rotated by a first rotational amount and a second steering mirror rotated by a second rotational amount, the first and second rotational amounts being such that the direction of propagation of a light ray directed by the first and second steering mirrors before rotation of the first and second steering mirrors is substantially parallel to the direction of propagation of a light ray directed by the first and second steering mirrors after rotation of the first and second steering mirrors, and such that the light ray after rotation of the first and second steering mirrors is translated relative to the light ray before rotation of the first and second steering mirrors on a sensor.

In an embodiment, the first steering mirror and the second steering mirror are arranged such that the length of the optical path between a reference point on a ray incident on the first steering mirror and a sensor is substantially the same before rotation of the first and second steering mirrors as after rotation of the first and second steering mirrors.

In an embodiment, the system is arranged to rotate each camera about an axis generally transverse to the direction of movement of the survey aircraft so as to provide at least partial compensation for forward movement of the survey aircraft.

In an embodiment, the shape of each ground coverage footprint is controllable by controlling when to start and stop image capture as the respective at least one camera rotates.

BRIEF DESCRIPTION OF THE DRAWINGS

The present invention will now be described, by way of example only, with reference to the accompanying drawings, in which.

DESCRIPTION OF AN EMBODIMENT OF THE INVENTION

Figure 1:
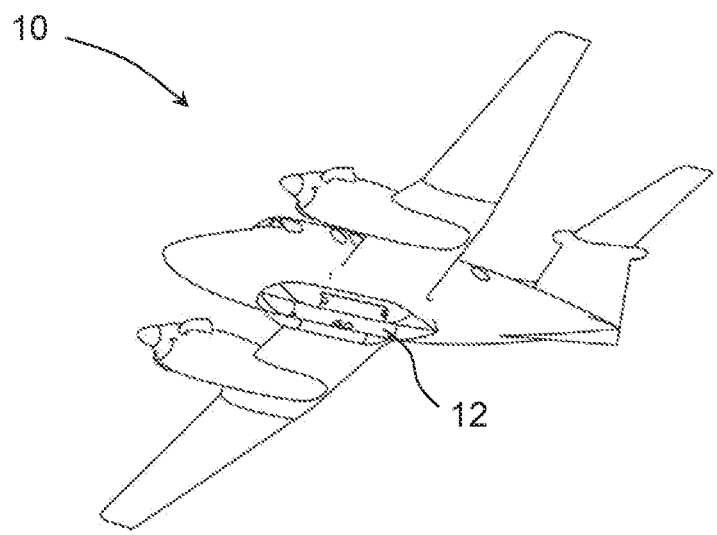
FIG. 1 is a diagrammatic representation of a survey aircraft incorporating an aerial camera system in accordance with an embodiment of the present invention.

Referring to FIG. 1 of the drawings, a survey aircraft 10 with mounted aerial camera system 12 is shown.

Figure 2:
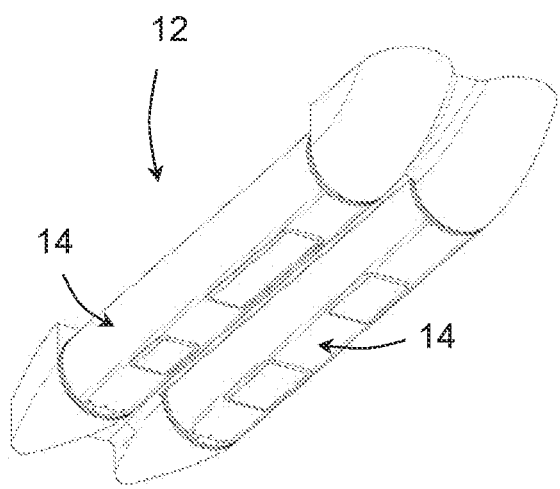
FIG. 2 is a diagrammatic perspective view of an aerial camera system in accordance with an embodiment of the present invention.
Figure 3:
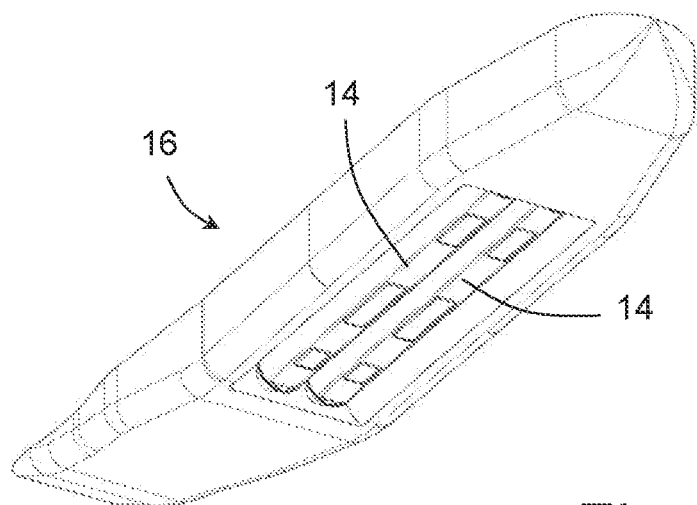
FIG. 3 is a diagrammatic perspective view of an alternatively packaged aerial camera system in accordance with an embodiment of the present invention.

The aerial camera system 12 includes at least one camera tube assembly 14 arranged to rotate about a respective central longitudinal axis. The camera tube assemblies 14 may be packaged in any suitable way, as shown in FIGS. 2 and 3. FIG. 2 shows a pair of adjacently disposed camera tube assemblies 14, and FIG. 3 shows a cargo pod assembly 16 that includes two camera tube assemblies 14.

Figure 4:
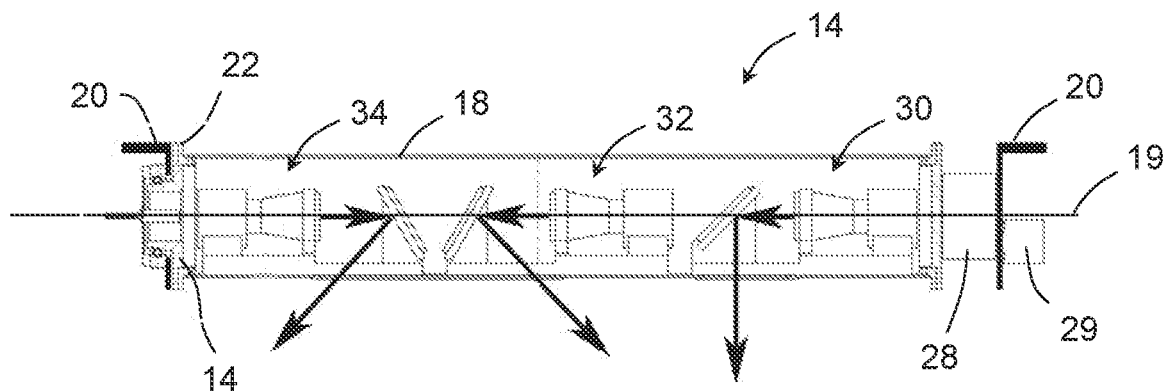
FIG. 4 is a diagrammatic cross-sectional view of a camera tube assembly of the aerial camera system shown in FIG. 2 or FIG. 3.
Figure 5:
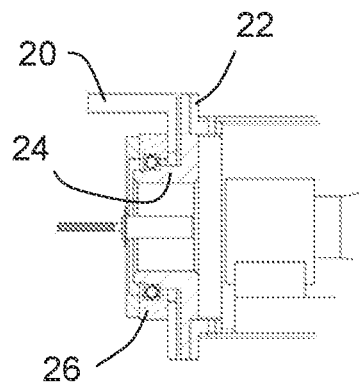
FIG. 5 is a diagrammatic cross-sectional view of a bearing assembly of the camera tube assembly shown in FIG. 4.

Referring to FIG. 4, a cross-sectional view of a camera tube assembly 14 is shown. FIG. 5 shows an enlarged view of an end portion of the camera tube assembly 14.

In this example, the camera tube assembly 14 includes a camera tube 18 arranged to rotate about a central longitudinal axis 19, in this example relative to an axle bulkhead 20 mounted relative to the survey aircraft 10.

The camera tube 18 is connected to a ring frame 22 and the ring frame 22 is fixed to an axle 24 that engages with a circular bearing 26 arranged to facilitate rotation of the axle 24 about the central longitudinal axis 19. Rotation of the camera tube 18 is affected by a motor, in this example a servo motor 28, and the servo motor 28 is controlled such that the rotational position of the camera tube 18 relative to the axle bulkhead 20 is controlled. In this example, the servo motor 28 includes a rotary encoder (not shown) that measures the instantaneous position of a rotor of the servo motor and thereby the rotational position of the camera tube 18 relative to the axle bulkhead 20. The servo motor 28 is controlled using an inertial measurement unit (IMU) 29 arranged to determine navigational information associated with the survey aircraft 10, such as velocity and acceleration information, and attitude reference information including information indicative of changes in roll, yaw and pitch of the survey aircraft 10.

In this example, the camera tube 18 includes an ortho camera assembly 30 and at least one oblique camera assembly, in this example a rear oblique camera assembly 32 and a forward oblique camera assembly 34. However, it will be understood that any number of ortho and oblique camera assemblies may be provided.

The ortho camera assembly 30 is arranged such that the field of view is directed generally vertically downwards in order to capture detail images of the ground directly beneath the survey aircraft 10. The detail images are used to produce high resolution ortho imagery with approximately 70% forward and 2% side overlap between frames, and approximately 70% side overlap between the ground coverage footprints of adjacent flight lines.

This arrangement provides a relatively high redundancy for the images captured by the ortho camera assembly 30.

In addition, as a consequence of the camera sweep the base-to-height ratio can improved for the ortho images because images of the same ground feature will be taken from different flight lines.

The rear and forward oblique camera assemblies 32, 34 are arranged such that the field of view is respectively directed rearwardly at an angle approximately 20° from vertical and forwardly at an angle approximately 20° from vertical, corresponding to a look angle of approximately 40°.

Figure 6:
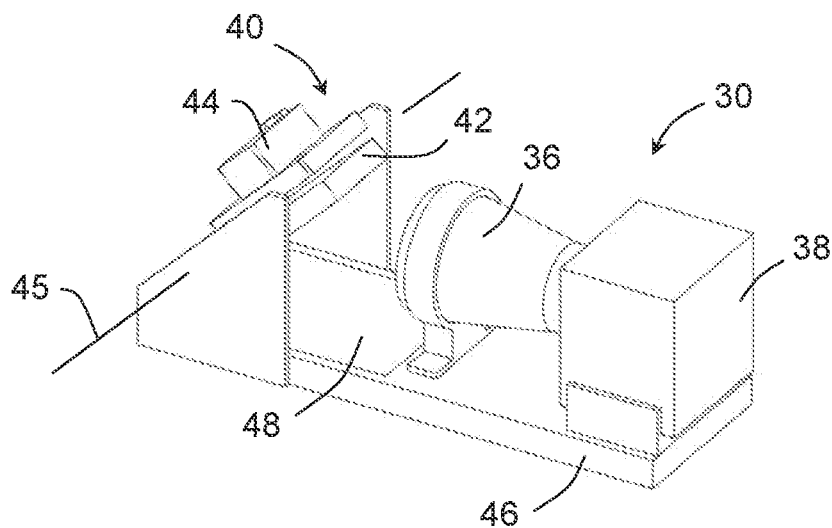
FIG. 6 is a diagrammatic perspective view of a camera assembly of the camera tube assembly shown in FIG. 4.

The structure of each of the ortho, rear oblique and forward oblique camera assemblies 30, 32, 34 is shown in FIG. 6.

The example shown in FIG. 6 is an ortho camera assembly 30 including a lens assembly 36, a sensor assembly 38 and a steering mirror assembly 40. The steering mirror assembly 40 is mounted so as to be positioned at a nominal down angle of about 45° so that light from the ground directly beneath the survey aircraft 10 is directed towards the lens assembly 36 and is in turn focused by the lens assembly 36 onto the sensor assembly 38.

In this example, each sensor in the sensor assembly 38 has a resolution of about 5 µm, pixel dimensions of about 5000×3883 and is capable of capturing about 10 frames per second, although it will be understood that other sensor variations are envisaged. The sensor may be a CMOS sensor with LCD shutter and in this example 2 sensors may be provided in the sensor assembly 38.

In this example, the lens assembly 36 of the ortho camera assembly 30 has a focal length of about 376 mm, although other focal lengths are envisaged, such as 1800 mm.

In this example, the focal length of the lens assembly 36 of each oblique camera assembly is 40% longer than the focal length of the lens assembly 36 of the ortho camera assembly 30. The oblique camera assemblies 32, 34 achieve a similar resolution to the ortho camera assembly 30 and result in a combined system redundancy of 21 with long baselines and thereby a strong geometry solution.

The steering mirror assembly 40 in this example includes a steering mirror 42 and a steering actuator 44 arranged to controllably rotate the steering mirror 42 about a generally transverse axis 45. The steering actuator 44 may include a rotary piezo-electric mechanism.

The lens assembly 36, the sensor assembly 38 and the steering mirror assembly 40 are mounted on a base 46 so that the lens assembly 36, the sensor assembly 38 and the steering mirror assembly 40 are correctly oriented and positioned relative to each other. A transparent panel 48 is disposed on the base 46 beneath the steering mirror 42 to prevent ingress of material into the space adjacent the steering mirror 42 and the lens assembly 36.

The steering mirror assembly 40 operates so as to rotate the steering mirror 42 at a rate corresponding to the instantaneous speed of the survey aircraft 10 and in this way provides a degree of compensation for image blur caused by forward movement of the survey aircraft 10.

This is achieved by effecting partial rotation of the steering mirror 42 in a direction so as to at least partially compensate for blur caused by forward motion of the survey aircraft 10, followed by rapid rotational movement of the steering mirror 42 in an opposite rotational direction to bring the steering mirror 42 back to a start position.

For example, at 150 m/s air speed at a flying height of 3048 m, the angular velocity at which to rotate the steering mirror is given by:

$$Va = \tan^{-1}(150/3048) = 2.817°/s$$

Although rotation of the steering mirror 42 in this way results in some geometric distortion of a captured image frame, the effect is substantially less than 1 pixel since the motion during each exposure is very low, given by:

$$\text{Camera rotation } (Ca) = \text{angular velocity} * \text{shutter speed}$$

$$Ca = 2.817 * 1/2000 = 0.001°$$

It will be understood that as the aircraft moves forwards, a plurality of images are captured 'across track', that is in a direction perpendicular to the direction of movement of the survey aircraft 10, by rotating the camera tube 18 about the central axis 19, capturing images periodically as the camera tube 18 rotates, and repeatedly retracting the camera tube 18 back to a start rotational position.

While scanning the camera assemblies 30, 32, 34 in this way enables multiple images to be captured at relatively low field of view with a lens of relatively high focal length and thereby relatively high resolution, rotating the camera tube 18 causes significant image blur.

For example, rotating a camera tube 18 at a scan rate of 3 seconds, with the scan covering a 2 km swathe width, has an image blur during a 1/2000 s exposure as follows:

Rotational velocity of the camera tube is given by:

$$V = 2000/3 = 666.67 \text{ m/s}$$

and given that:

Blur=velocity*shutter speed the consequent blur as a result of rotating the camera tube 18 is:

$$\text{Blur} = 666.67 * 100 * 1/2000 = 33.33 \text{ m}$$

At 7.5 cm resolution, 33.33 m equates to 444.4 pixels of blur.

In order to at least partially compensate for blur due to across-track scanning, in the present embodiment the system is arranged to reduce the angular velocity of the camera tube 18 during exposure in order to reduce motion blur to less than 50% of 1 pixel. The system may be arranged to halt rotational motion of the camera tube 18 in synchronisation with image capture, or alternatively to sufficiently reduce rotational movement of the camera tube 18 to enable image capture to occur with motion blur less than 50% of 1 pixel. Slowing down rotation without halting the rotation significantly reduces accelerations experienced by the system, which in turn reduces power consumption, makes the system easier to control, and reduces mechanical stress on system components.

Figure 7:
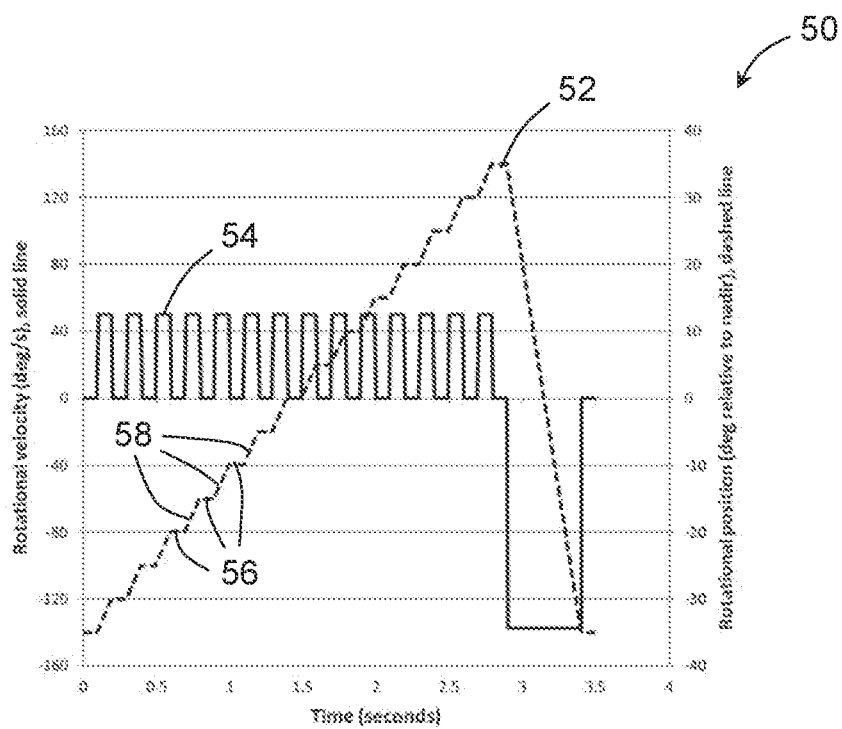
FIG. 7 is a camera tube movement plot illustrating rotational movement during use of a camera tube of the camera tube assembly shown in FIG. 4.

A camera tube movement plot 50 illustrating rotational movement during use of a camera tube of the camera tube assembly 30, 32, 34 is shown in FIG. 7.

The movement plot 50 includes a camera tube position plot 52 indicative of the rotational position of the camera tube 18 during one full scan of the camera tube 18. As shown, the camera tube 18 rotates between a rotational start position of about −35° to a rotational end position of about +35° in a stepwise manner over a period of about 3 s, then rotates back to the start position in about 0.5 s. As shown by a camera tube rotational velocity plot 54, the rotational velocity of the camera tube 18 repeatedly oscillates between zero and about 50°/s, respectively corresponding to flat portions 56 and inclined portions 58 on the camera tube position plot 52. It will be appreciated that the system 12 is arranged to control the sensor assembly 38 to capture an image at times synchronized with the flat portions 56.

Image blur is also affected by movement of the survey aircraft 10, including instantaneous roll of the survey aircraft 10.

The rotational speed of the steering mirror 42 and/or the rotational speed of the camera tube 18 may be adjusted to account for the frame rate of the sensor(s) of the sensor assembly 38, the required frame overlap, the effective field of view of the sensor(s) and instantaneous movement of the survey aircraft 10 including instantaneous roll of the survey aircraft 10.

For this purpose, in the present example the system includes an Inertial Navigation System (INS) arranged to determine the position and orientation of the survey aircraft in real time and to use the determined position and orientation information in order to estimate suitable motion compensation parameters for the steering actuator 44 and/or the servo motor 28. The INS includes the IMU 29 and a position input device, such as a GPS.

In this example, the position and orientation information associated with the survey aircraft 10, information indicative of the rotational position of the camera tube 18 derived from the position/rotation encoders of the servo motor 28, and information indicative of the rotational position of the steering mirror 42 are used to determine an initial exterior orientation solution (position and orientation) of each captured image.

Figure 8:
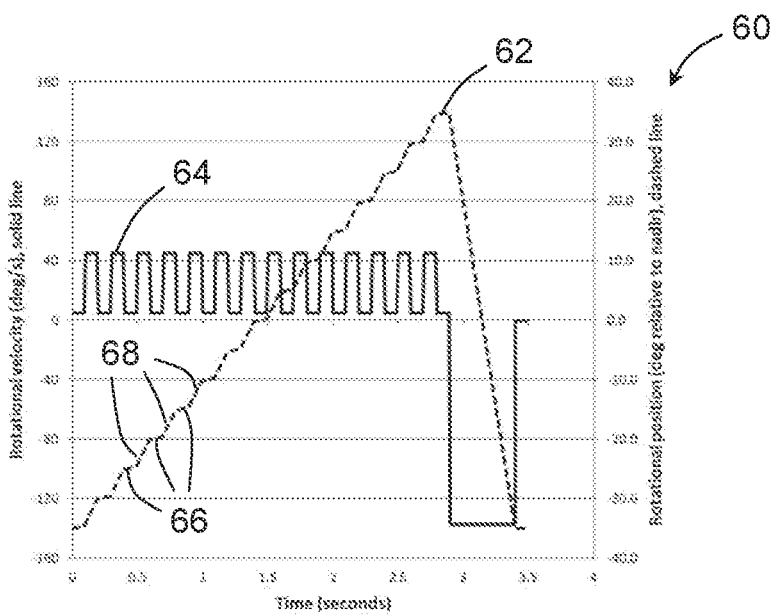
FIG. 8 is a camera tube movement plot illustrating alternative rotational movement during use of a camera tube of the camera tube assembly shown in FIG. 4.

An alternative camera tube movement plot 60 is shown in FIG. 8. The movement plot 60 includes a camera tube position plot 62 and a camera tube rotational velocity plot 64. The rotational velocity of the camera tube 18 repeatedly oscillates between a few degrees/s and about 42°/s, respectively corresponding to flat portions 66 and inclined portions 68 on the camera tube position plot 62. Maintaining the rotational velocity of the camera tube 18 above zero may reduce power consumption, improves controllability of rotation of the camera tube 18 and reduces mechanical stress. It will be appreciated that as with the camera tube movement plot 50 shown in FIG. 7, in an arrangement according to the camera tube movement plot 60 shown in FIG. 8, the system 12 is arranged to control the sensor assembly 38 to capture an image at times synchronized with the flat portions 66.

It will be understood that as the camera tube 18 rotates, the rear and forward oblique camera assemblies 32, 34 capture oblique images in forward and rearward regions, with the rotational movement of the camera tube 18 and the angle of view of the rear and forward oblique camera assemblies 32, 34 causing the camera field of view to scan a ground region across a generally parabolic path.

It will be understood that the ground regions covered by the ortho and oblique camera assemblies 30, 32, 34 are customisable to an extent by modifying when images are captured during rotation of the camera tube 18.

Figure 9:
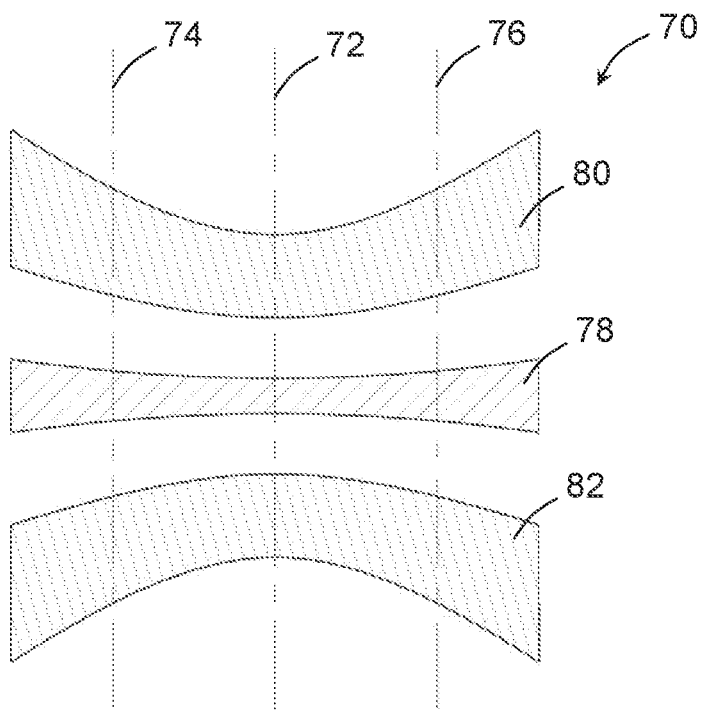
FIG. 9 is a diagrammatic representation of a ground coverage footprint illustrating regions of the ground that are covered by an ortho camera assembly and oblique camera assemblies.

An example ground coverage footprint 70 illustrating regions of the ground that are covered by an ortho camera assembly 30 and oblique camera assemblies 32, 34 is shown in FIG. 9. As shown, images are captured using the ortho 30 and oblique 32, 34 camera assemblies during an entire sweep of the camera tube 18 and across a current survey aircraft flight path 72 and first and second adjacent flight paths 74, 76 in an ortho ground coverage region 78, a front oblique ground coverage region 80 and a rear oblique ground coverage region 82.

Figure 10:
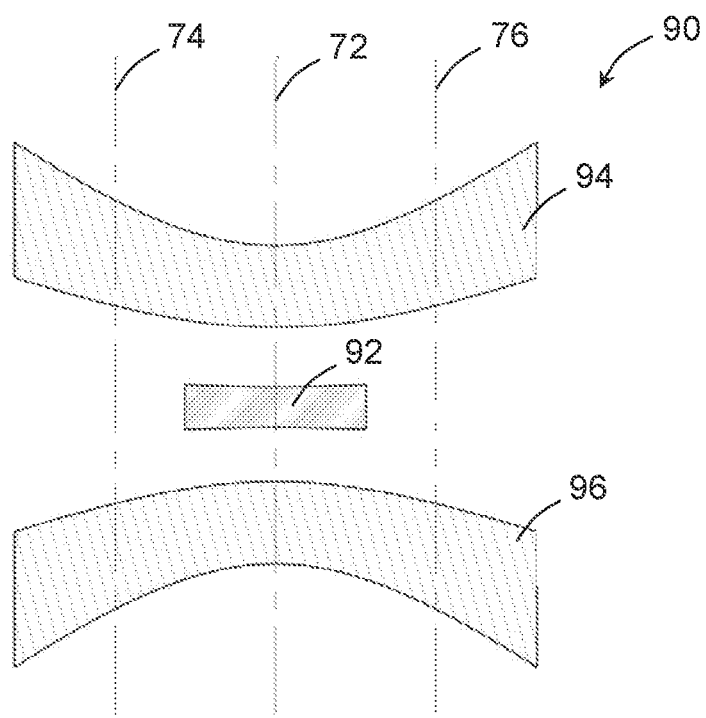
FIG. 10 is a diagrammatic representation of an alternative ground coverage footprint illustrating regions of the ground that are covered by an ortho camera assembly and oblique camera assemblies.

In an alternative ground coverage footprint 90 shown in FIG. 10, images are captured using the oblique camera assemblies 32, 34 during an entire sweep of the camera tube 18 and across a current survey aircraft flight path 72 and first and second adjacent flight paths 74, 76. Images are also captured using the ortho camera assembly 30, but only as the camera tube 18 sweeps across the current flight path 72. In the example shown in FIG. 10, an ortho ground coverage region 92, a front oblique ground coverage region 94 and a rear oblique ground coverage region 96 are covered.

It will be appreciated that the ground coverage regions 92, 94, 96 may be achieved by modifying when images are captured by the ortho camera assembly 30 during rotation of a camera tube 18 such that images are captured only during a narrower range of camera tube rotational positions that covers the current flight path 72. Alternatively, for example, the ground coverage regions 92, 94, 96 may be achieved by using different camera tubes 18 for the ortho and oblique camera assemblies 30, 32, 34 and appropriately controlling the camera tube 18 associated with the ortho camera assembly so that the ortho camera tube sweeps through a smaller rotational range centered at the current flight path 72.

Figure 11:
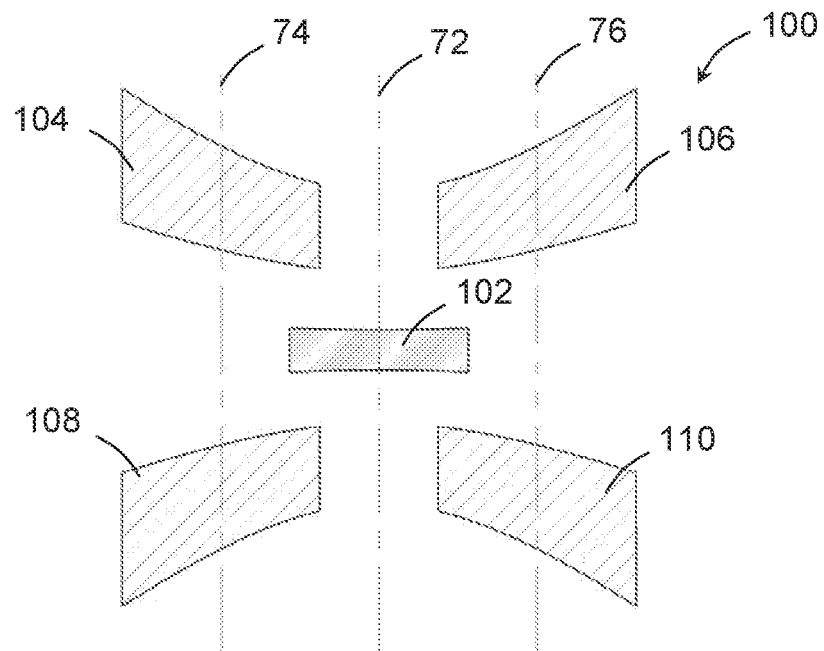
FIG. 11 is a diagrammatic representation of an alternative ground coverage footprint illustrating regions of the ground that are covered by an ortho camera assembly and oblique camera assemblies.

In a further alternative ground coverage footprint 100 shown in FIG. 11, images are captured using the ortho camera assembly 30 only as the camera tube 18 sweeps across the current flight path 72, and images are captured using the oblique 32, 34 camera assemblies only as the camera tube 18 sweeps across adjacent flight paths 74, 76. In the example shown in FIG. 11, an ortho ground coverage region 102, a first front oblique ground coverage region 104, a second front oblique ground coverage region 106, a first rear oblique ground coverage region 108, and a second rear oblique ground coverage region 110 are covered.

It will be appreciated that the illustrated ortho and oblique ground coverage regions may be achieved by modifying when images are captured by the ortho camera assembly 30 during rotation of a camera tube 18 such that images are captured by the ortho camera assembly 30 only during a narrower range of camera tube rotational positions centered at the current flight path 72, and modifying when images are captured by the oblique camera assemblies 32, 34 during rotation of the camera tube 18 such that images are captured by the oblique camera assemblies 32, 34 only during a range of camera tube rotational positions centered at each of the adjacent flight paths 74, 76.

Alternatively, for example, the ground coverage regions 102, 104, 106, 108, 110 may be achieved by using different camera tubes 18 for the ortho and oblique camera assemblies 30, 32, 34.

Figure 12:
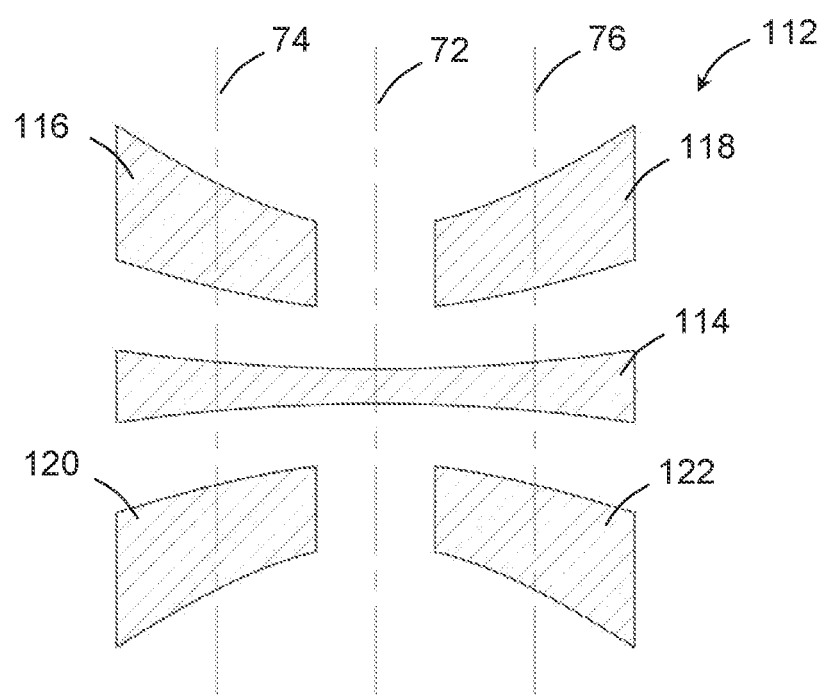
FIG. 12 is a diagrammatic representation of an alternative ground coverage footprint illustrating regions of the ground that are covered by an ortho camera assembly and oblique camera assemblies.

In a further alternative ground coverage footprint 112 shown in FIG. 12, images are captured using the ortho camera assembly 30 as the camera tube 18 sweeps across the current flight path 72 and adjacent flight paths 74, 76, and images are captured using the oblique camera assemblies 32, 34 only as the camera tube 18 sweeps across adjacent flight paths 74, 76. In the example shown in FIG. 12, an ortho ground coverage region 114, a first front oblique ground coverage region 116, a second front oblique ground coverage region 118, a first rear oblique ground coverage region 120, and a second rear oblique ground coverage region 122 are defined.

It will be appreciated that the illustrated ortho and oblique ground coverage regions may be achieved by modifying when images are captured by the oblique camera assemblies 32, 34 during rotation of a camera tube 18 such that images are captured by the oblique camera assemblies 32, 34 during rotation of the camera tube 18 only during a narrower range of camera tube rotational positions centered at each of the adjacent flight paths 74, 76.

Alternatively, for example, the ground coverage regions 114, 116, 118, 120, 122 may be achieved by using different camera tubes 18 for the ortho and oblique camera assemblies 30, 32, 34.

It will be understood that by mounting two oblique camera assemblies 32, 34 in the rotating camera tube 18, it is possible to obtain oblique images in 4 directions. The oblique swathe defined by each of the oblique camera assemblies 32, 34 forms an arc across 3 flight lines, with the view angle of the oblique swathe ranging between approximately 41-46°. As the oblique swathe has a long baseline, it adds considerable strength to the geometric solution, significantly improving accuracy.

It will also be understood that by using images produced by both the ortho camera(s) and the oblique camera(s) in a photogrammetric image processing process, a good bundle adjustment solution is achieved.

Figure 13:
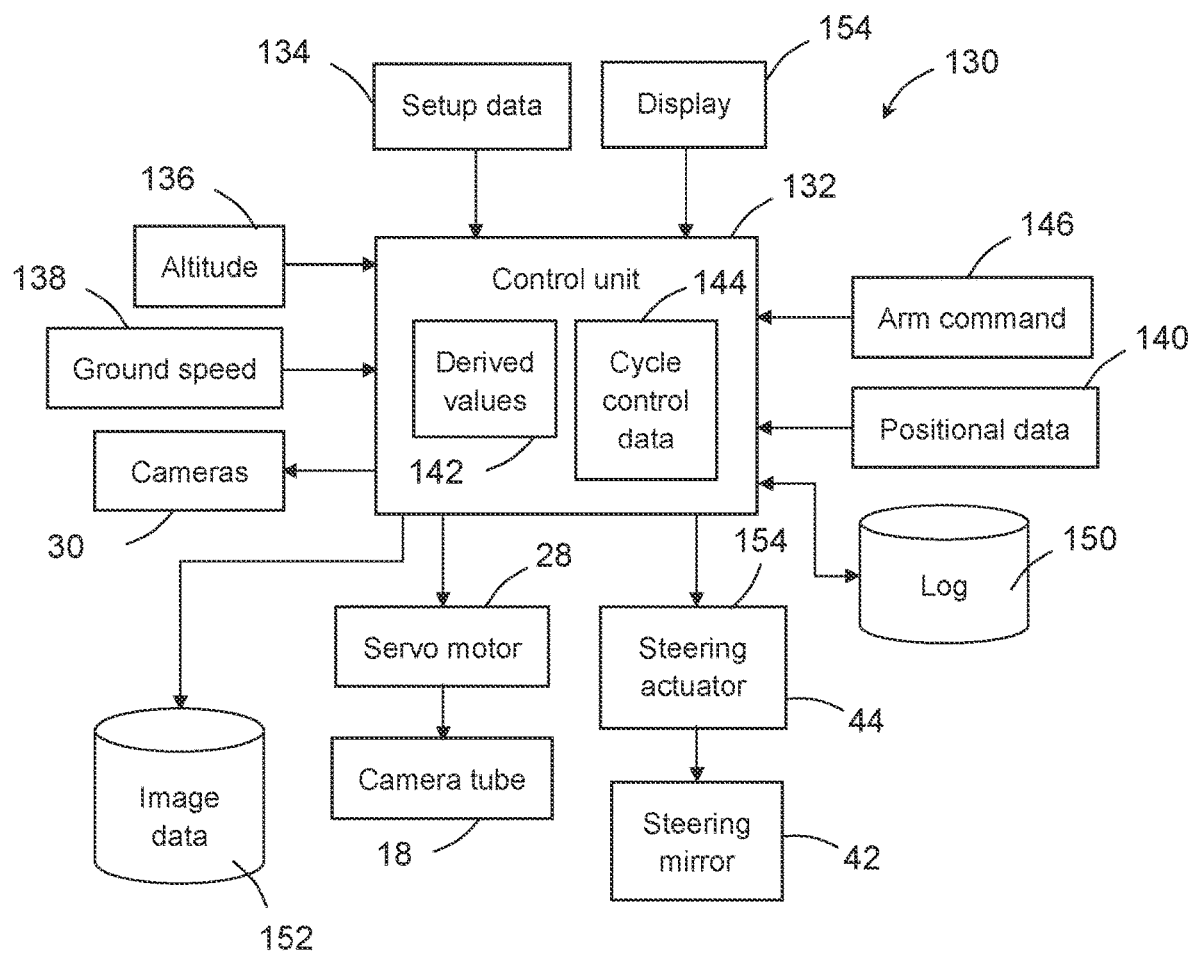
FIG. 13 is a block diagram illustrating operative components of an aerial camera system in accordance with an embodiment of the present invention.

Referring to FIG. 13, a block diagram 130 illustrating operative components of the aerial camera system 12 is shown. Like and similar features are indicated with like reference numerals.

The system includes a control unit 132 arranged to control and coordinate operations in the system, and in particular to receive setup data 134, altitude data 136 indicative of the current altitude (H) of the survey aircraft, ground speed data 138 indicative of the ground speed $V_g$ of the survey aircraft, and positional data 140 indicative of the position and orientation of the survey aircraft 10, and to use the received data to derive control parameters for the servo motor 28 and thereby the camera tube 18 and control parameters for the steering actuator 44 and thereby the steering mirror 42.

The control unit 132 may be implemented in any suitable way, and in this example the control unit 132 is implemented using a programmable logic controller (PLC) or a personal computing device provided with appropriate software and interfaces to implement desired functionality.

The setup data 134 in this example includes data indicative of a reference height ($H_{ref}$) corresponding to ground level, a frame forward angle (FF) indicative of the angle between consecutive captured image frames, a frame side angle (FS), a sweep angle (S) that defines the range of rotational movement of the camera tube 18, and a trigger altitude height $H_t$ that defines the altitude at which the aerial camera system 12 will commence capturing images.

Using the setup data 134, the control unit 132 calculates derived values 142 indicative of the number of image frames (N) to capture during each camera tube scan, and the start angle (SA) of each scan.

The start angle is defined by:

$$SA = FS * (N-1)/2$$

The control unit 132 uses the input data to calculate cycle control data 144, including a frame cycle time ($T_c$):

$$T_c = FF * (H - H_{ref})/V_g$$

The cycle control data 144 also includes a frame time step ($T_f$) indicative of the amount of time between capture of successive image frames:

$$T_f = T_c / (N * 1.25)$$

The cycle control data 144 also includes a frame rate value (FR):

$$FR = 1/T_f$$

The cycle control data 144 is used to control rotational movement of the camera tube 18 and appropriate control signals based on the cycle control data 144 are sent to the servo motor 28. The cycle control data 144 is also used to control rotational movement of the steering mirror 44 and appropriate control signals based on the cycle control data 144 are sent to the steering actuator 44.

The control signals generated by the control unit 132 and used by the servo motor 28 and the steering mirror 44 are produced based on the above calculations, and taking into account movement of the survey aircraft in pitch, roll and yaw using the positional data 140.

In this example, the system 130 is arranged such that image acquisition cannot start until an arm command 146 is received from an operator.

In this example, log data indicative of the parameters and settings used for an image capture operation are stored in a log database 150.

In this example, image frame data indicative of images captured by the system 130 are stored in an image data storage device 152 located on the survey aircraft.

In this example, the system 130 also includes a display 154 that provides status information for a pilot of the survey aircraft 10.

In the above described embodiments, in order to at least partially compensate for blur due to across-track scanning, the system is arranged to reduce the angular velocity of a camera tube 18 during exposure in order to reduce motion blur to less than 50% of 1 pixel.

Alternative arrangements for at least partially compensating for blur due to across-track scanning are shown in FIGS. 14 to 23.

Figure 14:
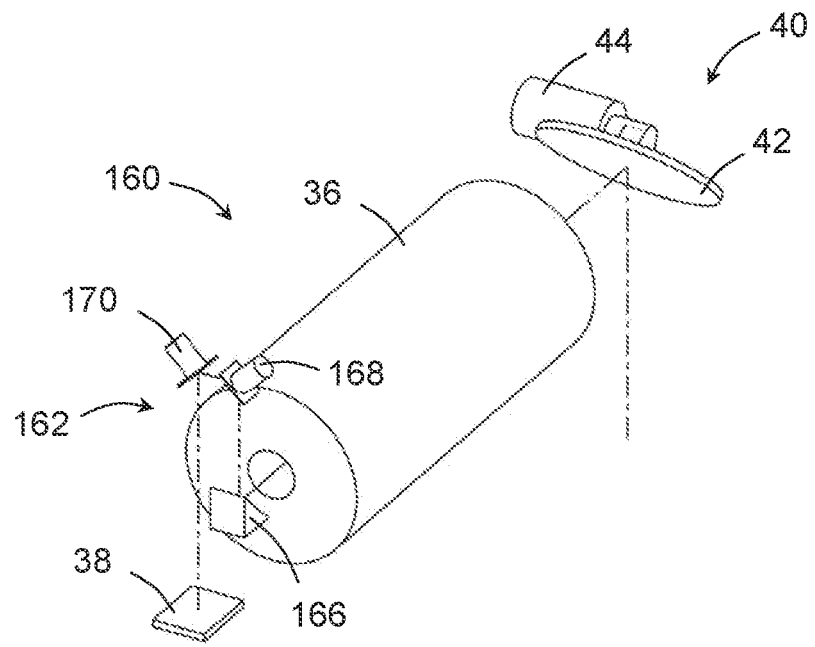
FIG. 14 is a diagrammatic perspective view of an alternative camera assembly in accordance with an embodiment of the invention, the camera assembly including a stabilisation assembly.

In FIG. 14, an alternative camera assembly 160 is shown that includes a stabilisation assembly 162 arranged to at least partially compensate for across-track scanning blur. Like and similar features are indicated with like reference numerals.

The stabilisation assembly 162 includes a primary folding mirror 166 that receives light from the lens assembly 36 and reflects the light at 90° towards a first fast steering mirror 168. The first fast steering mirror 168 reflects the light at approximately 90° towards a second fast steering mirror 170, which then reflects the light at approximately 90° towards the sensor assembly 38.

In this example, each of the first and second fast steering mirrors 168, 170 is a front coated optically flat articulating mirror mounted to an actuator that is capable of rapidly rotating a movable mirror, in this embodiment using a rotary piezo-electric mechanism. By synchronizing rotational movement of the articulating mirrors with rotational movement of the lens assembly 36, it is possible to effectively stabilize an image on the sensor of the sensor assembly 38 and thereby reduce image blur.

Figure 15:
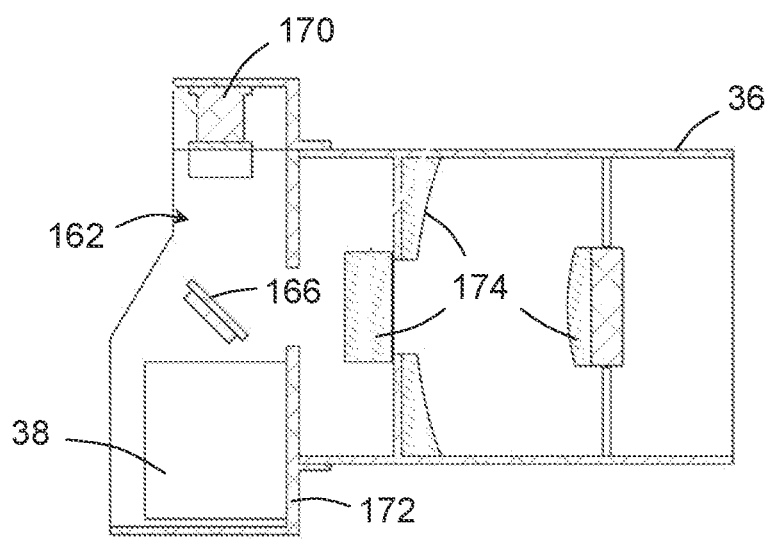
FIG. 15 is a diagrammatic cross sectional view taken along the line A-A in FIG. 16 of a stabilisation housing of the camera assembly shown in FIG. 14, the stabilisation housing attached to a lens assembly of the camera assembly.
Figure 16:
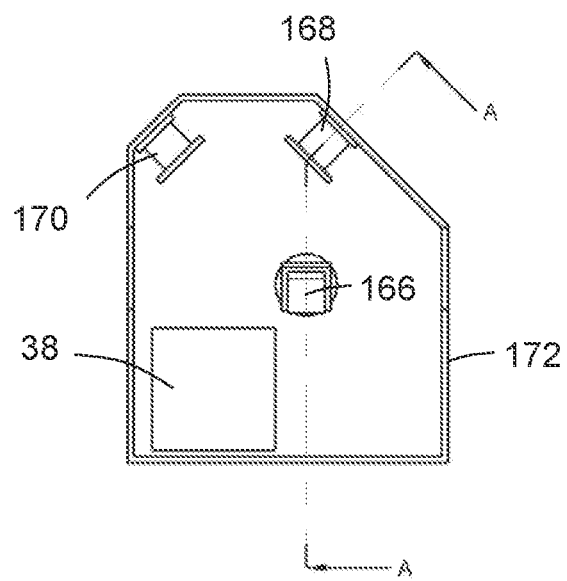
FIG. 16 is a diagrammatic cross sectional end view of the stabilisation housing shown in FIG. 15.

As shown in FIGS. 15 and 16, the stabilisation assembly 162 is disposed in a stabilisation housing 172 that attaches to the lens assembly 36, the components of the stabilisation assembly 162 being disposed such that light passing through optics 174 of the lens assembly 36 is directed to the primary folding mirror 166 and thereafter through the first and second fast steering mirrors 168, 170 to the sensor assembly 38.

Figure 17:
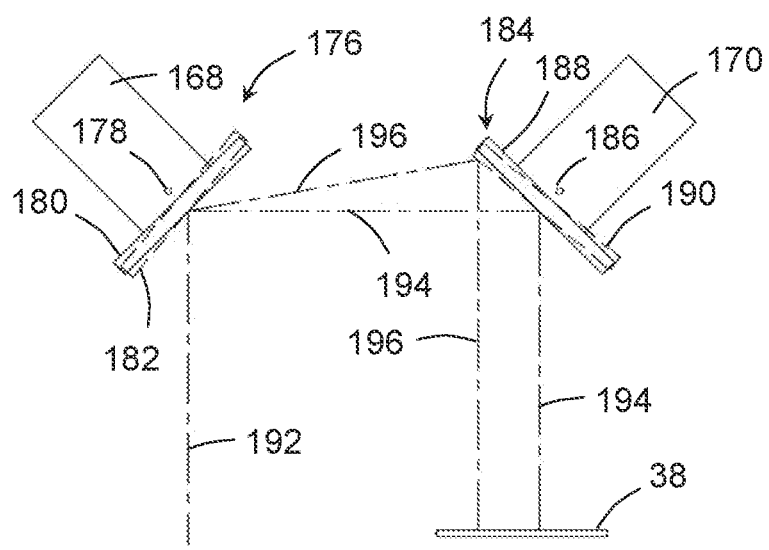
FIG. 17 is a diagrammatic view of the stabilisation assembly shown in FIG. 15 and illustrating propagation paths of light rays that pass through the stabilisation assembly shown in FIG. 14.

Referring to FIG. 17, the first fast steering mirror 168 includes a first movable mirror 176 that is capable of pivoting about a first pivot connection 178 between a first position 180 shown in solid lines and a second position 182 shown in broken lines. Similarly, the second fast steering mirror 170 includes a second movable mirror 184 that is capable of pivoting about a second pivot connection 186 between a first position 188 shown in solid lines and a second position 190 shown in broken lines.

FIG. 17 shows an example incident ray 192 that impinges on the first movable mirror 176 of the first fast steering mirror 168 and thereafter is reflected by the first fast steering mirror 168 onto the second movable mirror 184 of the second fast steering mirror 170, and by the second movable mirror 184 onto the sensor assembly 38.

When both of the first and second movable mirrors 176, 184 are disposed in the first position, the incident light ray 192 strikes the first movable mirror 176 at approximately 45° to the surface normal, and a first reflected ray 194 travels at approximately 90° to the incident ray 192 towards the second movable mirror 184. The first reflected ray 194 strikes the second movable mirror 184 at approximately 45° to the surface normal, and the first reflected ray 194 then travels toward the sensor assembly 38 in a direction approximately parallel to the incident ray 192.

If the first movable mirror 176 is rotated slightly about the first pivot connection 178 by the first fast steering mirror 168, in this example by 1°, so as to increase the angle of incidence of the incident ray 192 to 46°, a second reflected ray 196 is produced which travels at 92° to the incident ray 192 towards the second movable mirror 184.

If the second movable mirror 184 is rotated slightly about the second pivot connection 186 by the second fast steering mirror 170 and by the same rotational amount, in this example by 1°, the second reflected ray 196 then travels toward the sensor assembly 38 in a direction approximately parallel to the incident ray 192, but translated relative to the first reflected ray 194.

It will be understood that that since the first and second reflected rays 194, 196 that strike the sensor assembly 38 are parallel and spaced from each other, it follows that by rotating the first and second movable mirrors 176, 184 by the same angle, but in opposite directions relative to their reference angles, an image is translated on the sensor assembly 38 without rotation of the image.

It will also be understood that the length of the optical path from a reference point on the incident light ray 192 along the first reflected ray 194 to the sensor assembly 38 is approximately the same as the length of the optical path from the reference point on the incident light ray 192 along the second reflected ray 196 to the sensor assembly 38. As a consequence, the focus of the image on the sensor assembly 38 remains approximately the same irrespective of the rotational position of the first and second movable mirrors 176, 184.

Since the length of the optical path can be kept substantially constant, and the image on the sensor assembly 38 translated without rotating the image on the sensor assembly, by synchronising rotational movement of the first and second movable mirrors 176, 184, it is possible to hold an image substantially stationary on the sensor assembly 38 for the duration of an exposure, even though the camera assembly 160 is rotating about a longitudinal axis parallel to the direction of movement of the aircraft 10.

Figure 18:
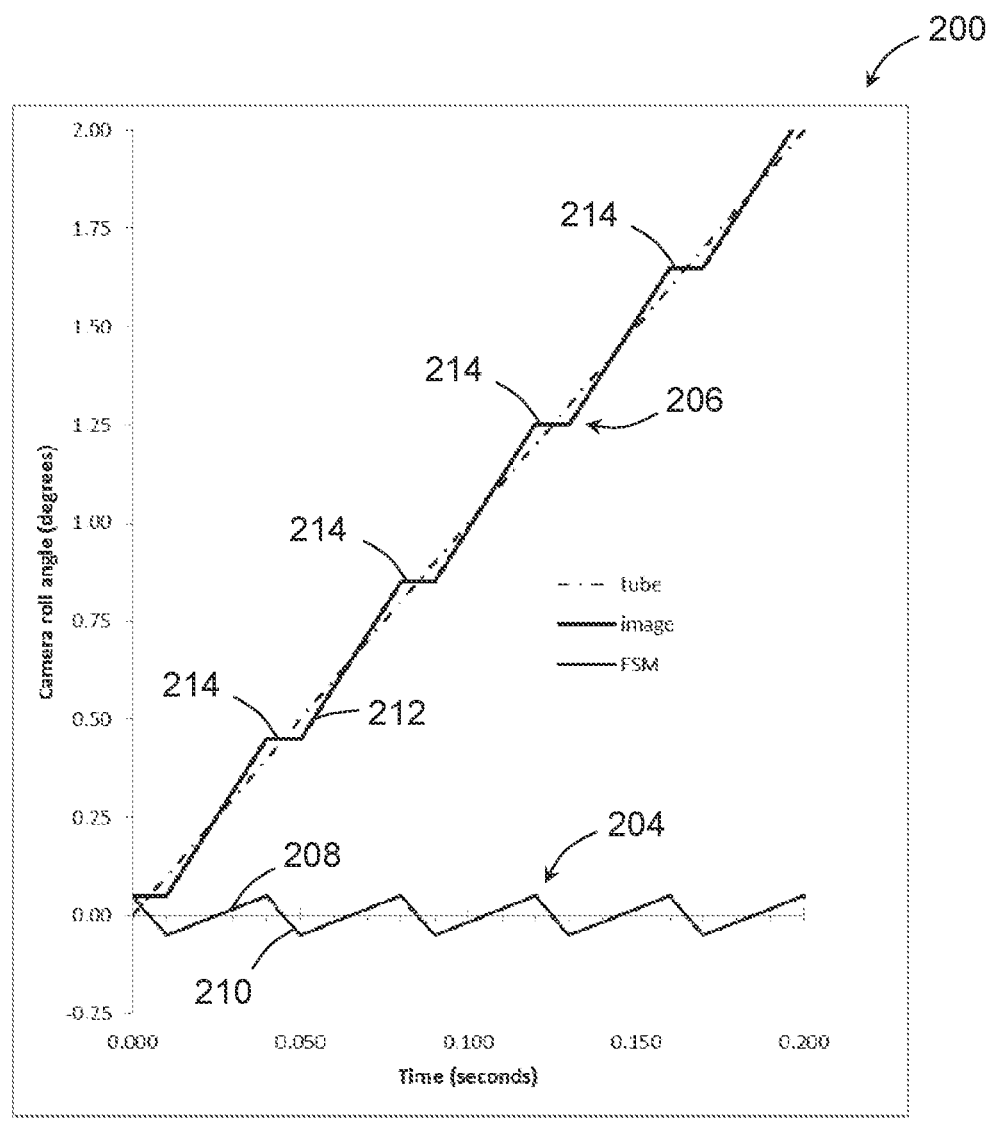
FIG. 18 is a plot illustrating movement of a camera tube and fast steering mirror of the camera assembly shown in FIG. 14, and movement of an image on an image sensor of the camera assembly shown in FIG. 14.

A diagram 200 illustrating rotational movement during use of a camera tube 18 that may include multiple camera tube assemblies 160 is shown in FIG. 18.

The diagram 200 includes a camera tube position plot 202 indicative of the rotational position of the camera tube 18 during part of a scan of the camera tube 18. The camera tube position plot 202 shows rotation of the camera tube 18 between about 0° and about +2°. In this example, the camera tube 18 is assumed to be rotating about its longitudinal axis at a rate that is approximately constant, such as 10°/s.

In this example, it is desired to expose an image on the sensor assembly 38 every 40 ms, with the image required to remain substantially stationary on the sensor assembly 38 for approximately 10 ms. In order to achieve this, the first and second movable mirrors 176, 184 are rotated together during the exposure time at a controlled rate based on the speed of rotation of the camera tube 18, so that the optical path length remains substantially constant and the rays striking the sensor assembly translate at a speed corresponding to the speed of rotation of the camera tube 18. During an exposure time of 10 ms and a tube rotation rate of 10 degrees per second with a 600 mm focal length lens, the optical axis may need to translate a typical distance of 4 mm across the face of the sensor. Assuming a spacing between the two fast steering mirrors of 20° mm, this requires a rotational range of movement of the fast steering mirrors of 0.66 degrees. The rate of rotation of the fast steering mirrors may be approximately 60 degrees per second during the exposure and the retrace rate may be typically 50% of this.

The diagram 200 includes a fast steering mirror position plot 204 that illustrates rotational movement of the first and second movable mirrors 176, 184. As shown the fast steering mirror position plot 204 includes shallow incline portions 208 and steep decline portions 210. The steep decline portions 210 correspond to movement of the first and second movable mirrors 176, 184 in a first rotational direction from a start position to an end position during exposure, and the shallow incline portions 208 correspond to movement of the first and second movable mirrors 176, 184 back to the start position from the end position before commencement of a subsequent exposure.

The diagram 200 also includes an image position plot 206 that illustrates the movement of images on the sensor assembly 38 as the camera tube 18 rotates and the first and second movable mirrors 176, 184 rotate in synchronisation with the exposure times and at a speed based on rotation of the camera tube 18. As shown, the image position plot 206 incudes inclined portions 212 and flat portions 214. The inclined portions 212 correspond to movement of the camera tube 18 outside of exposure times, and the flat portions 214 correspond to movement of the first and second movable mirrors 176, 184 during exposure and the presence of a substantially stable image on the sensor assembly 38.

Figure 19:
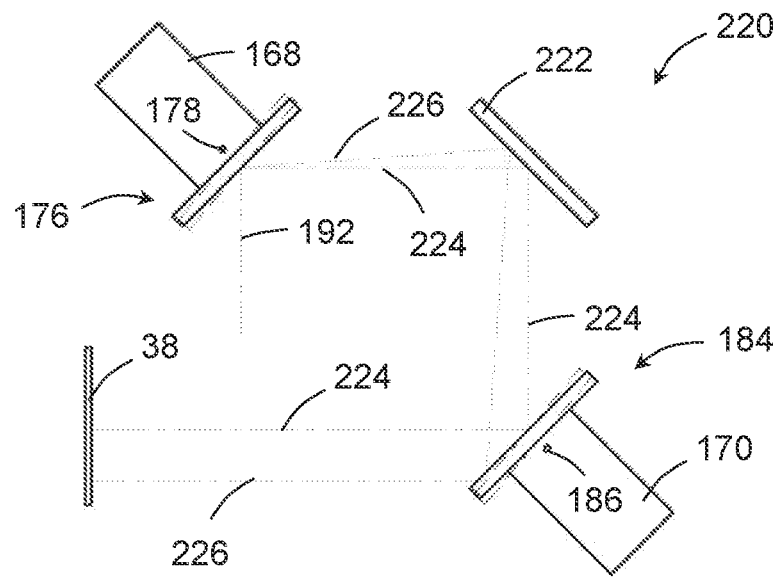
FIG. 19 is a diagrammatic view of an alternative stabilisation assembly and illustrating propagation paths of light rays that pass through the alternative stabilisation assembly.

An alternative stabilisation assembly 220 is shown in FIG. 19. Like and similar features are indicated with like reference numerals.

In addition to the first and second fast steering mirrors 168, 170, the stabilisation assembly 220 also includes a fixed intermediate folding mirror 222 disposed in the optical path between the first and second fast steering mirrors 168, 170. The intermediate folding mirror 222 has the effect of increasing the optical path length between the first and second fast steering mirrors 168, 170, thereby increasing the distance of translation of an image on the sensor assembly 38 for a particular amount of rotation of the fast steering mirrors 168, 170. As shown in FIG. 19, rotation of the first and second fast steering mirrors 168, 170 effects translation of a second reflected ray 226 relative to a first reflected ray 224 whilst maintaining the first and second reflected rays 224, 226 parallel.

Figure 20:
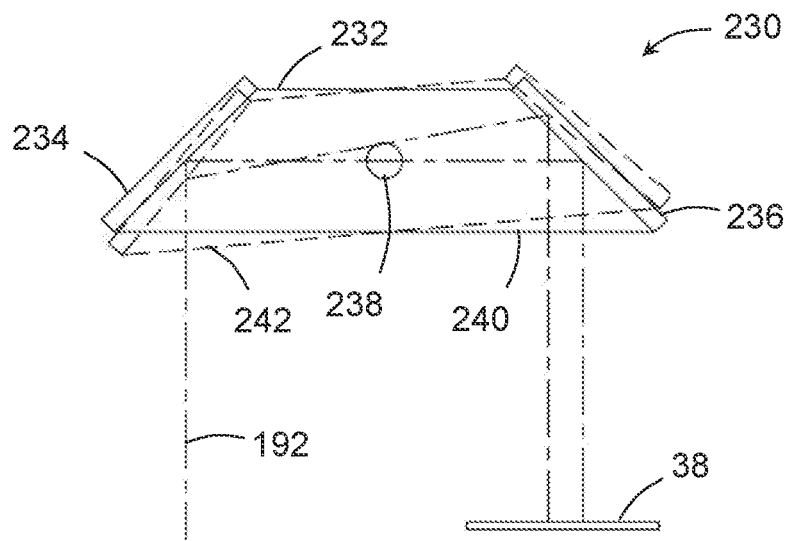
FIG. 20 is a diagrammatic view of a further alternative stabilisation assembly and illustrating propagation paths of light rays that pass through the further alternative stabilisation assembly.

A further alternative stabilisation assembly 230 is shown in FIG. 20. Like and similar features are indicated with like reference numerals.

With this arrangement, a fast steering common mirror assembly 232 is provided that includes first and second steering mirrors 234, 236, the common mirror assembly 232 being mounted so as to rotate about a pivot connection 238 between a first position 240 shown in solid lines and a second position 242 shown in broken lines.

Figure 21:
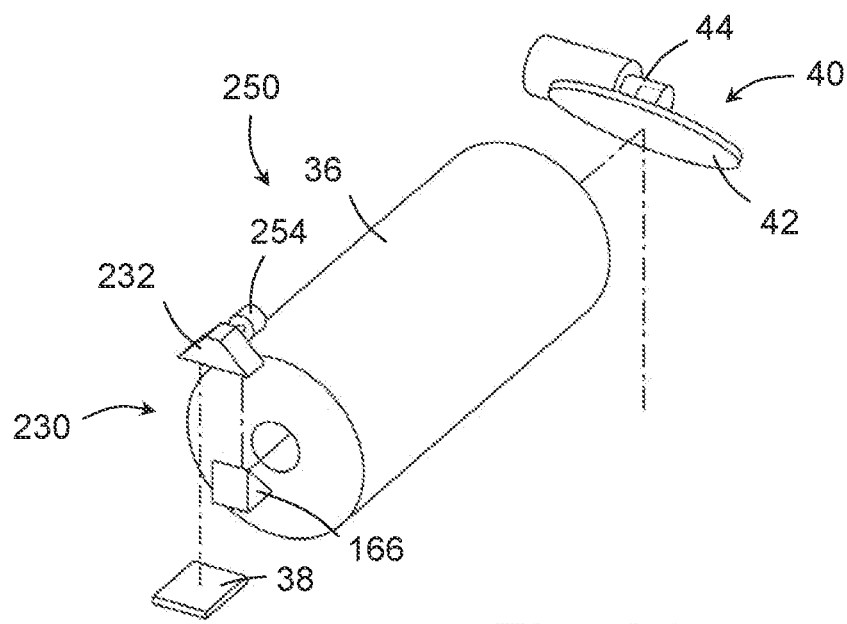
FIG. 21 is a diagrammatic perspective view of a further alternative camera assembly that includes the stabilisation assembly shown in FIG. 20.

An alternative camera assembly 250 that includes the alternative stabilisation assembly 230 is shown in FIG. 21.

As with the stabilisation assemblies shown in FIGS. 17 and 19, rotational movement of the common mirror assembly 232, for example using a piezo-electric actuator 254, causes rotational movement of the first and second steering mirrors 234, 236 and translation of light rays on the sensor assembly 38 without rotation of the image and without affecting the focus of the image on the sensor assembly 38.

Figure 22:
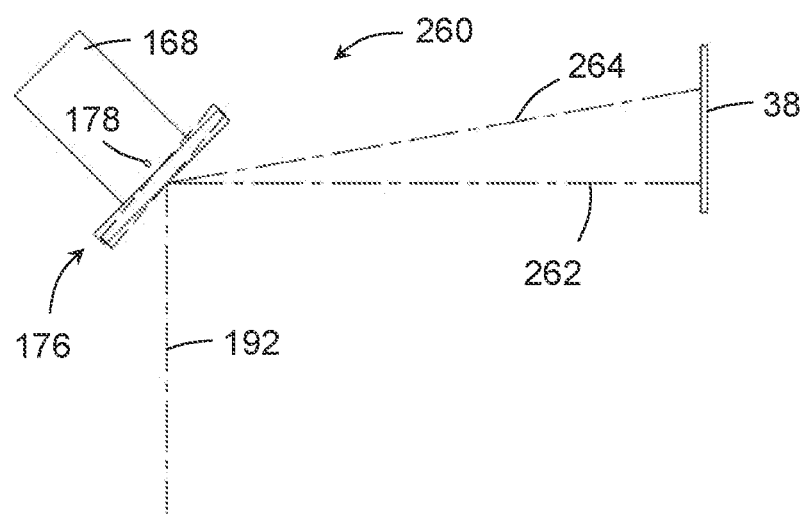
FIG. 22 is a diagrammatic view of a further alternative stabilisation assembly and illustrating propagation paths of light rays that pass through the stabilisation assembly.

A further alternative stabilisation assembly 260 is shown in FIG. 22. Like and similar features are indicated with like reference numerals.

With this arrangement, only one fast steering mirror 168 is provided in the optical path between the lens assembly 36 and the sensor assembly 38. As shown in FIG. 22 by first and second reflected rays 262, 264, rotation of the movable mirror 176 of the fast steering mirror 168 causes translation of the image on the sensor assembly 38, but with rotation of the optical axis and a small change in optical path length. Rotation of the image and a change in optical path length can be tolerated if the degree of rotation and change in optical path length are small. This embodiment is therefore envisaged only if the rotational movement of the movable mirror 176 need only be small in order to compensate for movement of an image on the sensor and enable exposure of a substantially stable image on the sensor for a sufficient amount of time for image capture.

Figure 23:
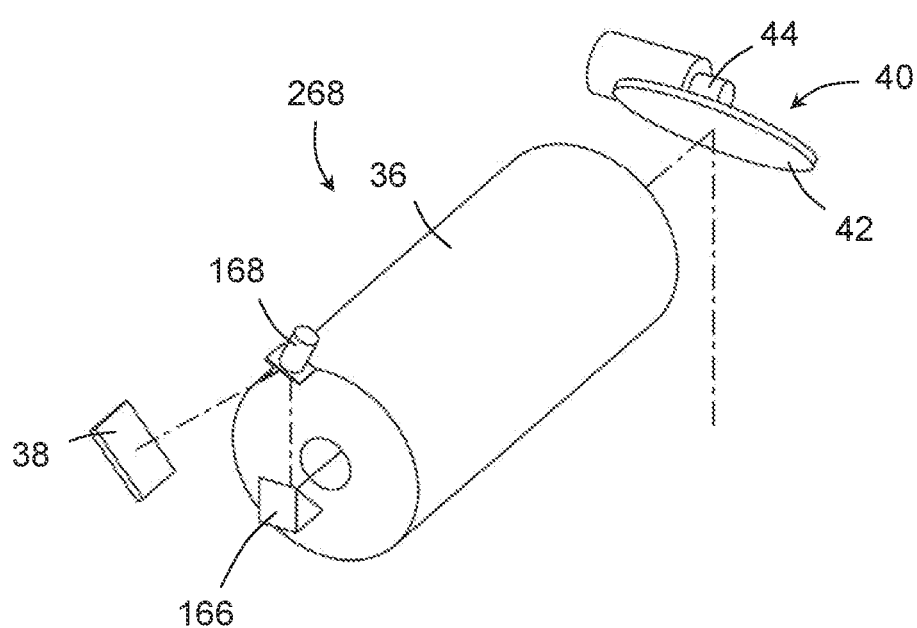
FIG. 23 is a diagrammatic perspective view of a further alternative camera assembly that includes the stabilisation assembly shown in FIG. 22.

An alternative camera assembly 268 that includes the alternative stabilisation assembly 260 is shown in FIG. 23.

Figure 24:
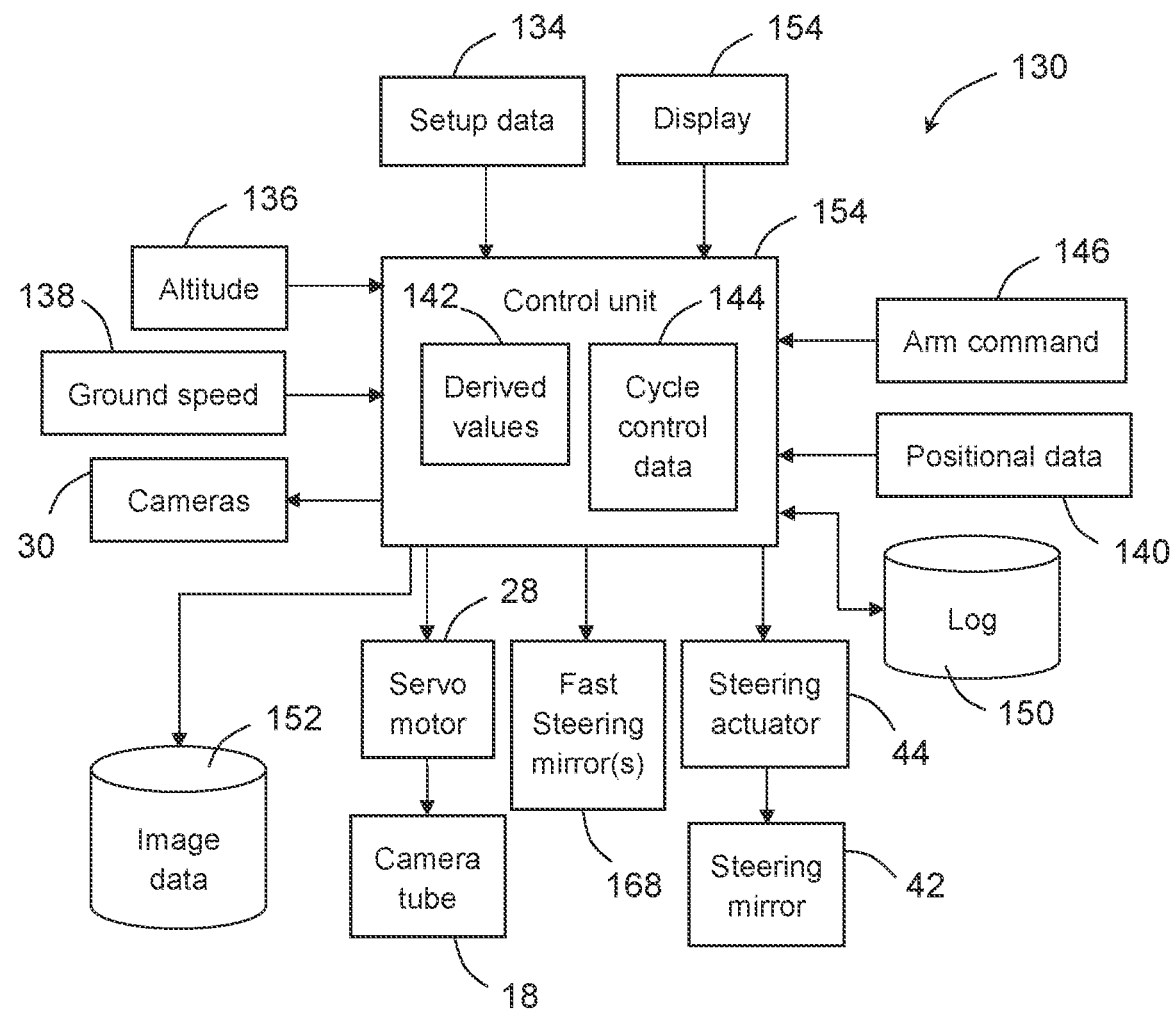
FIG. 24 is a block diagram illustrating operative components of an aerial camera system that includes an alternative camera assembly.

Referring to FIG. 24, a block diagram 270 illustrating operative components of an aerial camera system 12 that includes an alternative camera assembly provided with a stabilisation assembly 162, 220, 252, 260 is shown. Like and similar features are indicated with like reference numerals.

The system operates in a similar way to the embodiments described in relation to FIGS. 1 to 13 and in particular described with reference to the block diagram in FIG. 13.

The control unit 132 is arranged to control and coordinate operations in the system, and in particular to receive setup data 134, altitude data 136 indicative of the current altitude (H) of the survey aircraft, ground speed data 138 indicative of the ground speed $V_g$ of the survey aircraft, and positional data 140 indicative of the position and orientation of the survey aircraft 10, and to use the received data to derive control parameters for the servo motor 28 and thereby the camera tube 18 and control parameters for the steering actuator 44 and thereby the steering mirror 42.

As with the embodiments described in relation to FIGS. 1 to 13, the setup data 134 includes data indicative of a reference height ($H_{ref}$) corresponding to ground level, a frame forward angle (FF) indicative of the angle between consecutive captured image frames, a frame side angle (FS), a sweep angle (S) that defines the range of rotational movement of the camera tube 18, and a trigger altitude height $H_t$ that defines the altitude at which the aerial camera system 12 will commence capturing images.

As with the embodiments described in relation to FIGS. 1 to 13, using the setup data 134, the control unit 132 calculates derived values 142 indicative of the number of image frames (N) to capture during each camera tube scan, and the start angle (SA) of each scan.

The control unit 132 uses the input data to calculate cycle control data 144, including a frame cycle time ($T_c$). The cycle control data 144 also includes a frame time step ($T_f$) indicative of the amount of time between capture of successive image frames, and a frame rate value (FR). The cycle control data 144 is used to control rotational movement of the camera tube 18 and appropriate control signals based on the cycle control data 144 are sent to the servo motor 28. The cycle control data 144 is also used to control rotational movement of the steering mirror 44 and appropriate control signals based on the cycle control data 144 are sent to the steering actuator 44.

The control signals generated by the control unit 132 and used by the servo motor 28 and the steering mirror 44 are produced based on the above calculations, and taking into account movement of the survey aircraft in pitch, roll and yaw using the positional data 140.

The control unit 132 also produces control signals for the or each fast steering mirror 168, 170 in order to rotate the or each movable mirror 176, 184 in synchronisation with image capture and by an amount and speed so that a substantially stable image is disposed on the sensor assembly 38 for a sufficient amount of time to effect image capture.

Stopping the rotational motion of the tube for each image capture without use of the stabilisation mirrors allows a maximum rate of approximately 20 frames per second to be captured by each sensor. A representative combination of 600 mm focal length lenses mounted to an aircraft operating at 25,000 ft and a speed of 450 km/hr provides approximately 5 cm resolution imagery. The maximum frame rate is limited by vibration induced in the camera system by the constant stop-start rotational motion which may limit lens and sensor life.

Using the stabilisation fast steering mirrors and a constant tube rotation allows a maximum rate of approximately 100 frames per second to be captured. Using 1,800 mm focal length lenses mounted to an aircraft operating at 35,000 ft and a speed of 600 km/hr provides approximately 4 cm resolution imagery. The advantage of this system is the increase in maximum frame rate which is possible because negligible vibration is induced in the camera system by the oscillatory movements of the relatively low mass fast steering mirrors. The higher frame rate also allows the use of longer focal length lenses and faster aircraft forward speed resulting in a significant productivity advantage.

It will be appreciated that the present aerial camera system 12 has high redundancy and strong geometry, which enables a good solution to be achieved during a bundle adjustment process of a photogrammetric image processing process.

As numerous control parameters of the system are dynamic, such as control of forward motion compensation, control of across-track motion compensation, and control of timing of image capture, the system is capable of compensating for hardware failures, such as failure of one sensor in a multi-sensor configuration, albeit with potentially degraded performance.

It will be appreciated that the present aerial camera system significantly increases productivity and improves potential accuracy over systems known hitherto.

In particular, the system simultaneously captures a nadir and 4 oblique ground coverage regions using as few as 3 sensors, has a high level of overlap between adjacent images and a consequent redundancy of 21, and long oblique baselines that result in strong geometry.

The present system also has a compact design, and enables high productivity to be achieved since a large number of images are captured by rotating the camera tube 18.

The system also has motion compensation in both along-track and across-track directions that enables high resolution images to be captured from higher altitude than with aerial image capture systems known hitherto.

Figure 25:
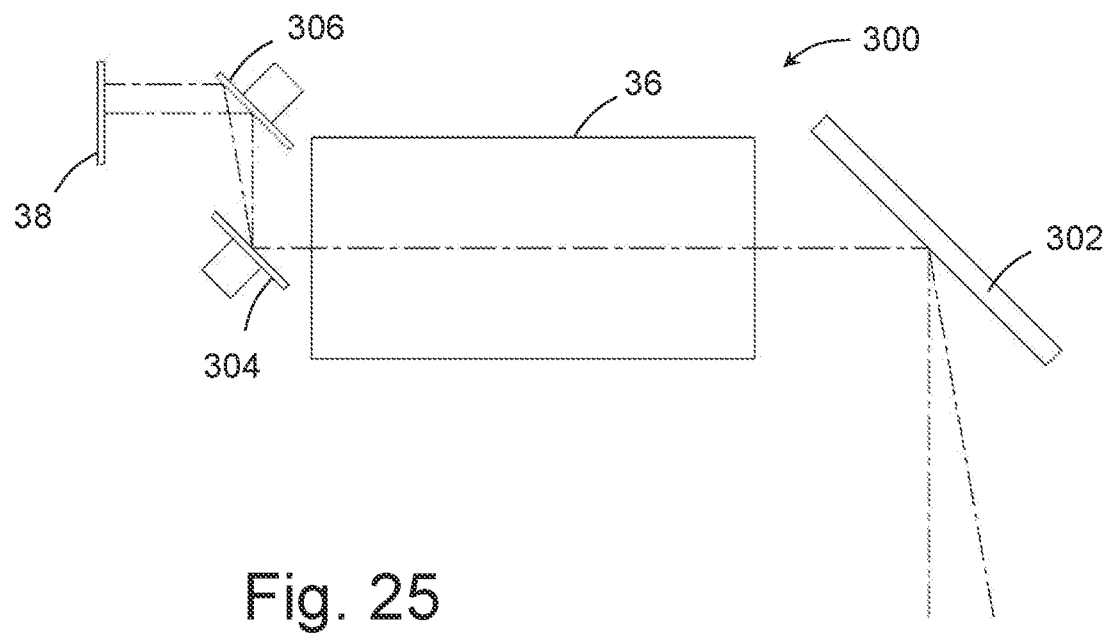
FIG. 25 is a diagrammatic view of an alternative along-track stabilisation assembly and illustrating propagation paths of light rays that pass through the alternative stabilisation assembly.

Referring to FIG. 25, an alternative arrangement 300 is provided for at least partially compensating for image blur caused by forward motion of the survey aircraft. In the present example, the alternative arrangement 300 is described in relation to the embodiment shown in FIGS. 1 to 13 although it will be understood that the alternative arrangement is applicable to other embodiments. Like and similar features are indicated with like reference numerals.

With this variation, instead of providing a steering mirror 42 disposed before the lens assembly 36 that rotates at a speed based on the speed of the survey aircraft, a fixed steering mirror 302 is provided to direct light from the ground beneath the survey aircraft towards the lens assembly 36, and first and second fast steering mirrors 304, 306 are provided. In a similar way to operation of the first and second fast steering mirrors 168, 170 in the embodiment shown in FIG. 14, the fast steering mirrors 304, 306 rotate in synchronisation with each other in order to translate the lens axis on the sensor 38 and thereby provide at least partial stabilisation of an image on the sensor 38 in an along track direction.

It will be understood that the speed of rotation of the first and second fast steering mirrors 304, 306 is dependent on the speed of the survey aircraft.

Figure 26:
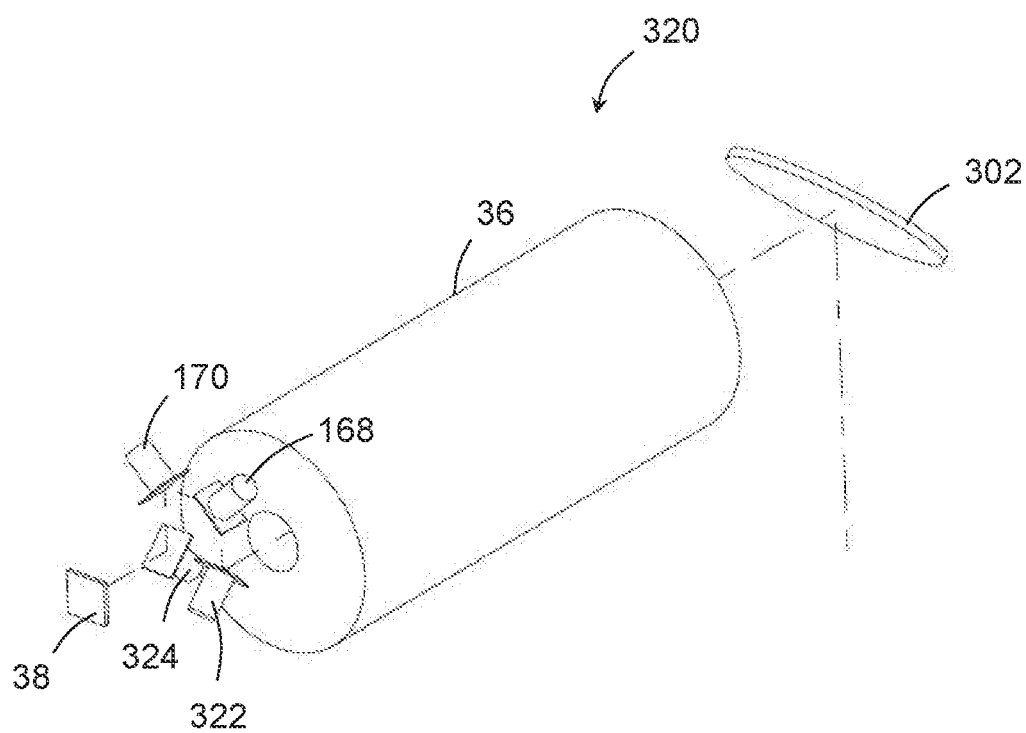
FIG. 26 is a diagrammatic perspective view of an alternative camera assembly including the stabilisation assembly of FIG. 14 and also including the alternative along-track stabilisation assembly of FIG. 25.
Figure 27:
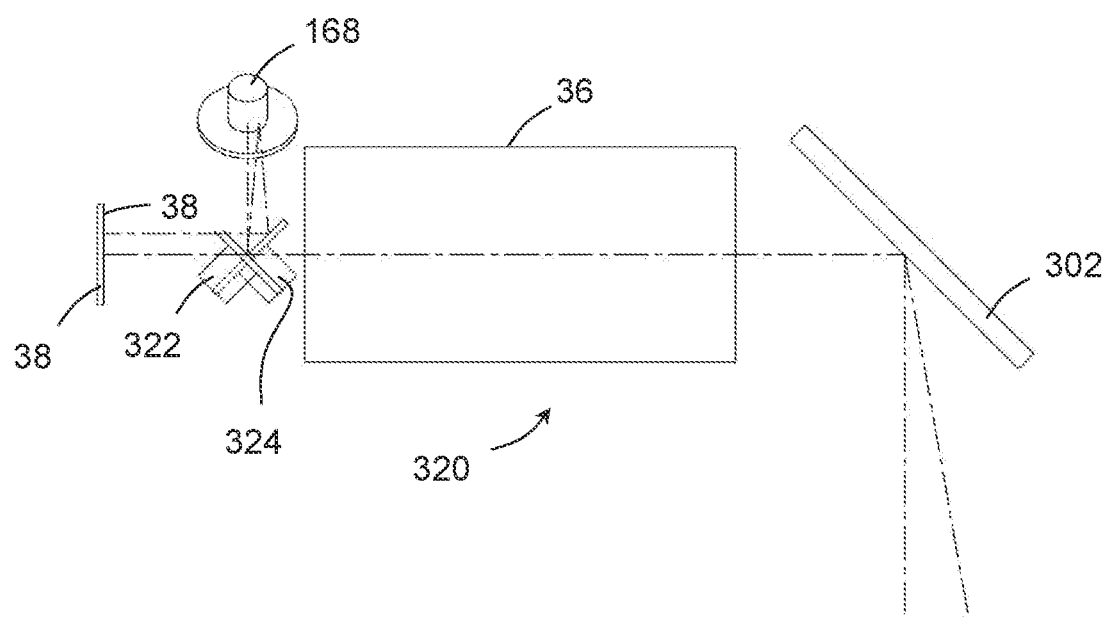
FIG. 27 is a diagrammatic view of the alternative camera assembly shown in FIG. 26 and illustrating propagation paths of light rays that pass through the camera assembly shown in FIG. 26.

Referring to FIGS. 26 and 27, an alternative arrangement 320 is provided for at least partially compensating for image blur caused by forward motion of the survey aircraft and across track motion of a camera assembly. In this example, the alternative arrangement 320 is described in relation to the embodiment shown in FIGS. 14 to 18 although it will be understood that the alternative arrangement 320 is applicable to other embodiments. Like and similar features are indicated with like reference numerals.

This variation includes the along track stabilisation arrangement shown in FIG. 25 applied to a camera assembly 160 that uses a pair of fast steering mirrors to at least partially compensate for across track motion of the rotating camera assembly 160. With this variation, therefore, a fixed steering mirror 302 is provided to direct light from the ground beneath the survey aircraft towards the lens assembly 36, and third and fourth fast steering mirrors 322, 324 are provided to at least partially compensate for along track motion of the survey aircraft, in addition to first and second fast steering mirrors 168, 170 that at least partially compensate for across track motion of the camera assembly 160.

Figure 28:
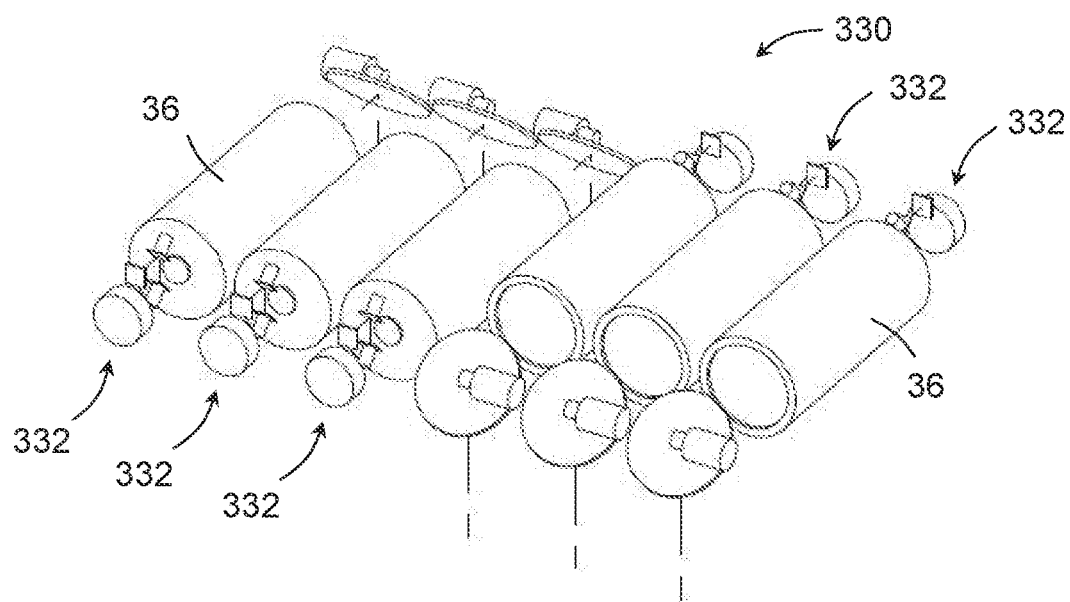
FIG. 28 is a diagrammatic perspective view of an alternative aerial camera system in accordance with a further embodiment of the invention, the aerial camera system including several camera assemblies.

Referring to FIG. 28, a further alternative aerial camera system 330 is provided. Like and similar features are indicated with like reference numerals.

Figure 29:
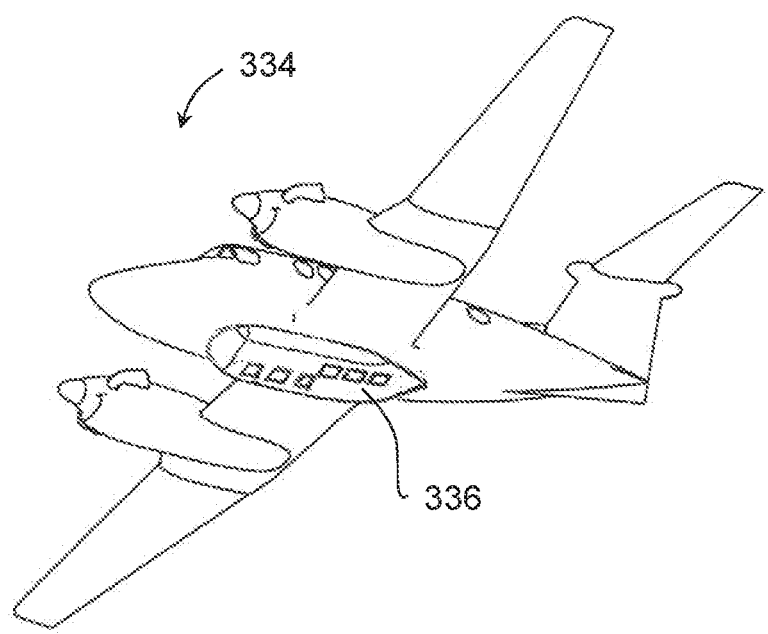
FIG. 29 is a diagrammatic representation of a survey aircraft incorporating the aerial camera system shown in FIG. 25.

The alternative camera system 330 includes several camera assemblies 332 oriented such that the central longitudinal axis of the lens array 36 of each camera assembly 332 extends generally perpendicular to the direction of motion of the survey aircraft. In this example, the camera assemblies 332 are packaged such that 3 camera assemblies 332 are oriented in a first direction and 3 camera assemblies are oriented in in a second direction opposite to the first direction. A survey aircraft 334 including suitable packaging 336 for the camera assemblies is shown in FIG. 29.

Figure 30:
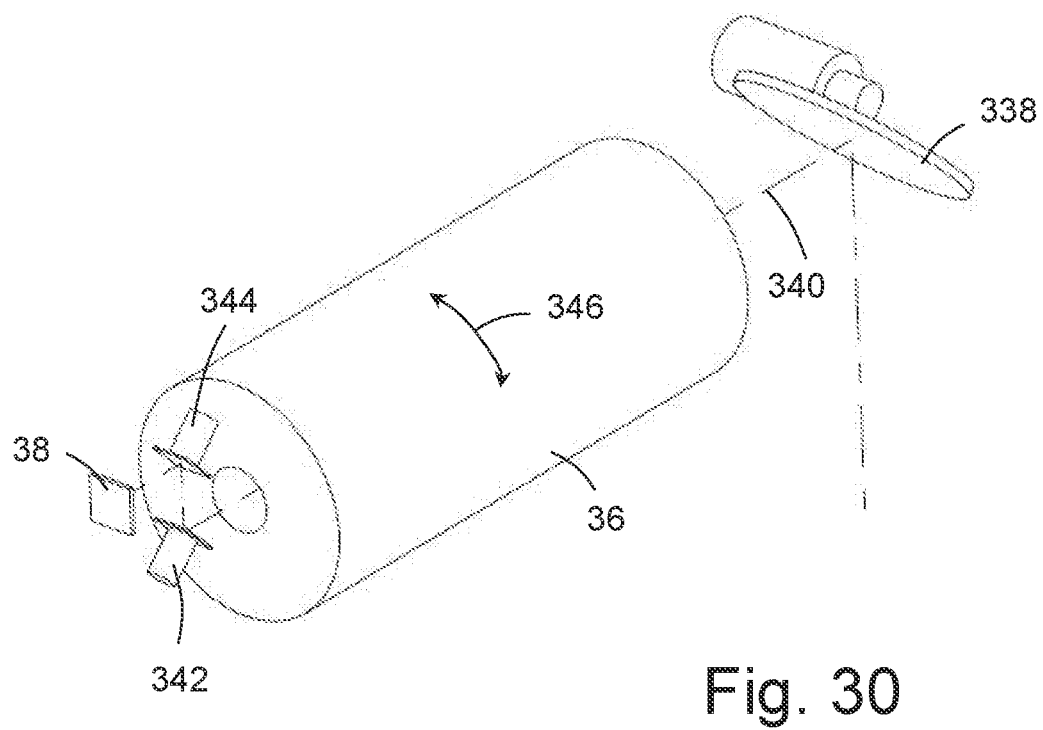
FIG. 30 is a diagrammatic perspective view of an alternative camera assembly that includes an alternative stabilisation assembly

Each camera assembly 332 is shown in more detail in FIG. 30 and includes a primary steering mirror 338 that is capable of rotating during use about an axis generally parallel to the direction of motion of the aircraft 334 through a range 45° to 135° relative to the lens assembly central longitudinal axis 340.

Each camera assembly 332 also includes first and second fast steering mirrors 342, 344, a lens assembly 36 and a sensor 38.

Each camera assembly 332 is arranged to rotate about its respective central axis 340 as indicated by arrow 346 at a speed dependent on the speed of the survey aircraft 334. The rotational movement of the camera assembly 332 is similar to the rotational movement of the steering mirror 42 described in relation to the embodiments shown in FIGS. 6 and 14 wherein the steering mirror 42 rotates in a first direction corresponding to the instantaneous speed of the survey aircraft then rotates rapidly in an opposite direction. In this way, it will be appreciated that at least partial compensation for image blur caused by forward motion of the survey aircraft 334 is provided.

During a survey, images are captured across-track by rotating the primary steering mirror 338, capturing images periodically as the primary steering mirror 338 rotates, and repeatedly rotating the primary steering mirror 338 back to a starting rotational position.

It will be appreciated that the rotational movement of the primary steering mirror 338 in this way achieves a similar effect to rotational movement of the camera assembly 30, 160 about an axis parallel to the direction of motion of the survey aircraft described in relation to the embodiments shown in FIGS. 6 and 14.

As with the embodiment shown in FIG. 14, at least partial compensation for image blur caused by the across track movement is achieved using the first and second fast steering mirrors 342, 344 by synchronising rotational movement of the first and second fast steering mirrors 342, 344 with rotation of the primary steering mirror during the exposure time, and thereby substantially holding an image stationary on the sensor assembly 38 during exposure.

Figure 31:
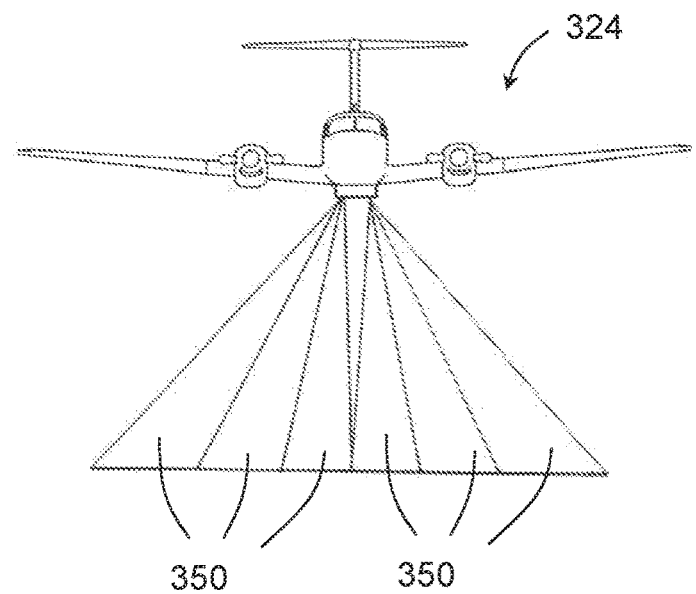
FIG. 31 is a diagrammatic representation of the survey aircraft shown in FIG. 29 and illustrating the respective scan ranges of the camera assemblies of the camera tube assembly shown in FIG. 28.
Figure 32:
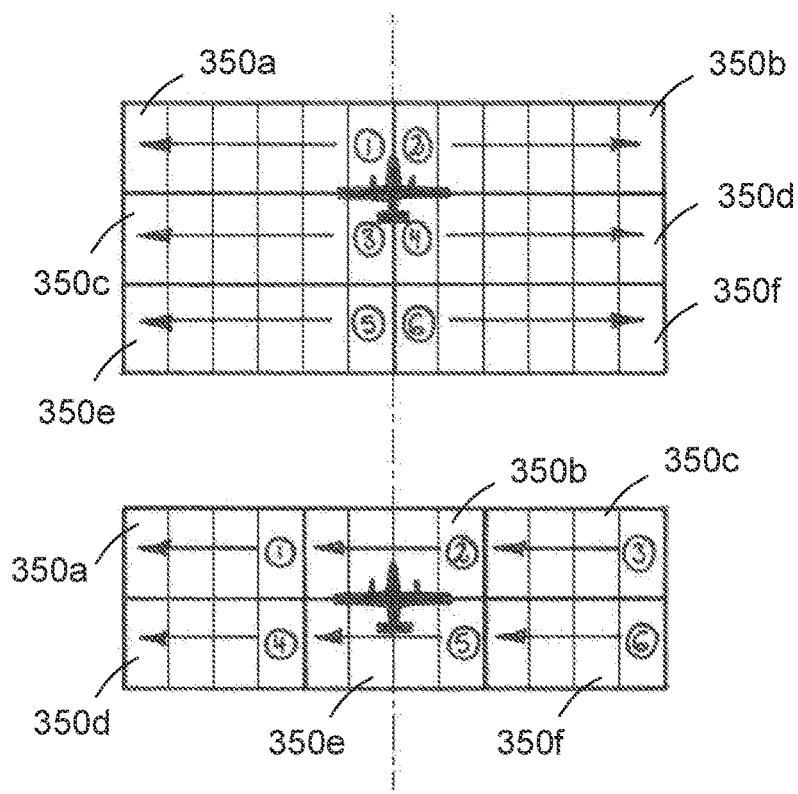
FIG. 32 is a diagrammatic plan view of the respective scan ranges shown in FIG. 30.

As shown in FIGS. 31 and 32, in this example each camera assembly 332 is configured so that the field of view of the camera assemblies differs, for example by locating and configuring the camera assemblies such that the camera assemblies 332 cover respective regions 350 that together cover a contiguous area of the ground beneath the survey aircraft 334.

For example, as shown in FIG. 32, the regions 350 may be disposed in a pattern such that the camera assemblies cover regions in a pattern that is 2 regions wide (in a direction transverse to the direction of movement of the survey aircraft) and 3 regions long (in a direction parallel to the direction of movement of the survey aircraft), or alternatively 3 regions wide and 2 regions long.

Modifications and variations as would be apparent to a skilled addressee are deemed to be within the scope of the present invention.

What is claimed is:
1. An aerial camera system, comprising:
at least two cameras of a survey aircraft including at least one ortho camera and at least one oblique camera, the at least two cameras arranged to capture a plurality of successive images, the at least two cameras rotatable such that fields of view of the cameras traverse across a region of the ground that includes multiple different swathes extending in different directions, each of the at least two cameras having a lens assembly and a steering mirror to direct light reflected from the ground onto the lens assembly, the lens assembly having a central longitudinal axis extending in a direction generally parallel to a direction of movement of the survey aircraft, the at least two cameras configured to capture successive images at defined intervals within a rotational path of the at least two cameras.

2. The aerial camera system of claim 1, wherein the field of view of the at least one oblique camera traverses across a generally parabolic shaped region of the ground.

3. The aerial camera system of claim 1, wherein the system is arranged to rotate the at least two cameras about an axis substantially parallel to the direction of movement of the survey aircraft.

4. The aerial camera system of claim 1, wherein the system is arranged to rotate the at least two cameras by oscillating the at least two cameras between a rotational start position and a rotational end position.

5. The aerial camera system of claim 4, wherein the rotational start position corresponds to about −35 degrees and the rotational end position corresponds to about +35 degrees.

6. The aerial camera system of claim 1, wherein the system is arranged to control rotation of the at least two cameras using a servo motor and a rotary encoder.

7. The aerial camera system of claim 1, wherein the system is arranged to use a detected position and/or orientation of the survey aircraft to determine whether to modify the rotational position of the at least two cameras in order to provide at least partial compensation for changes to the position and/or orientation of the survey aircraft.

8. The aerial camera system of claim 1, wherein the at least two cameras are mounted in a camera tube and the system is arranged to control rotation of the camera tube.

9. The aerial camera system of claim 1, wherein the at least one ortho camera is arranged to capture images representative of a ground area substantially directly beneath the survey aircraft to produce a ground coverage footprint.

10. The aerial camera system of claim 9, wherein the system is arranged to control the at least one ortho camera to capture successive images at defined intervals such that successive images overlap.

11. The aerial camera system of claim 9, wherein the system is arranged to control the at least one ortho camera to capture successive images such that adjacent ground coverage footprints in a direction parallel to the direction of travel of the survey aircraft overlap.

12. The aerial camera system of claim 9, wherein the system is arranged to control survey aircraft flight lines such that ortho camera ground coverage footprints of adjacent flight lines overlap.

13. The aerial camera system of claim 9, wherein each ortho camera has an associated ortho lens assembly arranged to focus light onto at least one ortho sensor.

14. The aerial camera system of claim 1, further comprising a processor configured to control the at least two cameras and to control the rotational speed of the at least two cameras.

15. A method, comprising:
rotating at least two cameras of a survey aircraft including at least one ortho camera and at least one oblique camera, such that a field of view of each camera traverses across a region of the ground that includes multiple different swathes extending in different directions, each camera having an associated steering mirror to direct light reflected from the ground onto a lens assembly of each camera, the lens assembly having a central longitudinal axis extending in a direction generally parallel to a direction of movement of the survey aircraft; and
controlling the at least two cameras to capture successive images at defined intervals within a rotational path of the at least two cameras.

16. The method of claim 15, wherein rotating the at least one oblique camera comprises rotating the at least one oblique camera such that the field of view of the at least one oblique camera traverses across a generally parabolic shaped region of the ground.

17. The method of claim 15, wherein rotating the at least two cameras comprises rotating the at least two cameras about an axis substantially parallel to the direction of movement of the survey aircraft.

18. The method of claim 17, further comprising using a detected position and/or orientation of the survey aircraft to determine whether to modify the rotational position of the at least two cameras in order to provide at least partial compensation for changes to the position and/or orientation of the survey aircraft.

19. The method of claim 15, wherein controlling the at least two cameras to capture successive images at defined intervals comprises determining a number of image frames to capture within the rotational path of the at least two cameras.

20. The method of claim 19, wherein determining the number of image frames to capture within the rotational path of the at least two cameras is based on one or more of a reference height corresponding to ground level, a frame forward angle, a frame side angle, a sweep angle that defines a range of rotational movement of the at least two cameras, and a trigger altitude height.

21. The method of claim 15, wherein controlling the at least two cameras to capture successive images at defined intervals within a rotational path of the at least two cameras comprises controlling a rotational speed of the at least two cameras based upon an instantaneous roll of the survey aircraft.

22. The method of claim 15, wherein controlling the at least two cameras to capture successive images at defined intervals within a rotational path of the at least two cameras comprises determining a start angle of each rotation.

23. The method of claim 22, wherein determining the start angle of each rotation is based on one or more of a reference height corresponding to ground level, a frame forward angle, a frame side angle, a sweep angle that defines a range of rotational movement of the at least two cameras, and a trigger altitude height.

24. The method of claim 15, wherein controlling the at least two cameras to capture successive images at defined intervals within a rotational path of the at least two cameras comprises utilizing a processor configured to control the at least two cameras and to control the rotational speed of the at least two cameras.

* * * * *